US008474016B2

(12) United States Patent
Carley

(10) Patent No.: US 8,474,016 B2
(45) Date of Patent: *Jun. 25, 2013

(54) SECURE MANAGEMENT ACCESS CONTROL FOR COMPUTERS, EMBEDDED AND CARD EMBODIMENT

(75) Inventor: Jeffrey Alan Carley, Colorado Springs, CO (US)

(73) Assignee: Infinite Bay Telecom Limited Liability Company, Dover, DE (US)

( * ) Notice: Subject to any disclaimer, the term of this patent is extended or adjusted under 35 U.S.C. 154(b) by 1035 days.

This patent is subject to a terminal disclaimer.

(21) Appl. No.: 11/946,976

(22) Filed: Nov. 29, 2007

(65) Prior Publication Data

US 2008/0072291 A1 Mar. 20, 2008

Related U.S. Application Data

(63) Continuation of application No. 10/969,561, filed on Oct. 20, 2004, now Pat. No. 7,325,140, which is a continuation-in-part of application No. 10/461,827, filed on Jun. 13, 2003, now Pat. No. 7,496,950.

(60) Provisional application No. 60/512,777, filed on Oct. 21, 2003, provisional application No. 60/438,282, filed on Jan. 6, 2003, provisional application No. 60/388,287, filed on Jun. 13, 2002.

(51) Int. Cl.
*G06F 15/16* (2006.01)

(52) U.S. Cl.
USPC ............ 726/3; 726/2; 713/300; 713/310; 713/320; 713/330; 713/340; 710/119; 710/305; 709/203; 709/208; 709/225; 709/226; 709/229

(58) Field of Classification Search
USPC ............. 726/6, 18, 2–3; 709/236, 203, 208, 709/225–226, 229; 710/17, 107, 108, 119, 710/305; 713/300, 310, 320, 330, 340
See application file for complete search history.

(56) References Cited

U.S. PATENT DOCUMENTS

| | | | |
|---|---|---|---|
| 5,309,563 | A | 5/1994 | Farrand et al. |
| 5,367,670 | A | 11/1994 | Ward et al. |
| 5,541,911 | A | 7/1996 | Nilakantan et al. |
| 5,684,957 | A | 11/1997 | Kondo et al. |
| 5,689,566 | A | 11/1997 | Nguyen |
| 5,761,428 | A | 6/1998 | Sidey |
| 5,764,886 | A | 6/1998 | Danielson et al. |
| 5,848,161 | A | 12/1998 | Luneau et al. |
| 5,907,862 | A * | 5/1999 | Smalley ................. 711/163 |

(Continued)

OTHER PUBLICATIONS

Jaehong Park at al.; Towards Usage Control Models: Beyond Traditional Access Control.

(Continued)

*Primary Examiner* — Thanhnga B Truong

(57) ABSTRACT

A computer network management apparatus and method for remotely managing a networked device. The apparatus and method includes a management processor which is in direct communication with the networked device. The apparatus and method provides access for remotely and securely managing a networked device. The apparatus and method further separates management communications from user communications to ensure the security of the management communications. The apparatus and method further includes network and power monitoring and notification systems. The apparatus and method further provides authentication and authorization capabilities for security purposes.

21 Claims, 32 Drawing Sheets

U.S. PATENT DOCUMENTS

| | | | |
|---|---|---|---|
| 5,968,176 | A | 10/1999 | Nessett et al. |
| 6,049,826 | A | 4/2000 | Beser |
| 6,055,575 | A | 4/2000 | Paulsen et al. |
| 6,079,020 | A | 6/2000 | Liu |
| 6,085,243 | A | 7/2000 | Fletcher et al. |
| 6,108,713 | A * | 8/2000 | Sambamurthy et al. ...... 709/250 |
| 6,108,782 | A | 8/2000 | Fletcher et al. |
| 6,148,337 | A | 11/2000 | Estberg et al. |
| 6,167,403 | A | 12/2000 | Whitmire et al. |
| 6,189,102 | B1 | 2/2001 | Beser |
| 6,205,466 | B1 | 3/2001 | Karp et al. |
| 6,219,790 | B1 | 4/2001 | Lloyd et al. |
| 6,243,815 | B1 | 6/2001 | Antur et al. |
| 6,304,973 | B1 | 10/2001 | Williams |
| 6,335,927 | B1 | 1/2002 | Elliott et al. |
| 6,343,320 | B1 | 1/2002 | Fairchild et al. |
| 6,366,585 | B1 | 4/2002 | Dapper et al. |
| 6,373,838 | B1 | 4/2002 | Law et al. |
| 6,389,464 | B1 | 5/2002 | Krishnamurthy et al. |
| 6,408,392 | B2 | 6/2002 | White |
| 6,421,691 | B1 | 7/2002 | Kajitani |
| 6,424,647 | B1 | 7/2002 | Ng et al. |
| 6,446,200 | B1 | 9/2002 | Ball et al. |
| 6,456,306 | B1 | 9/2002 | Chin et al. |
| 6,473,795 | B1 | 10/2002 | Danielson et al. |
| 6,473,863 | B1 | 10/2002 | Genty et al. |
| 6,477,595 | B1 | 11/2002 | Cohen et al. |
| 6,480,955 | B1 | 11/2002 | Dekoning et al. |
| 6,484,261 | B1 | 11/2002 | Wiegel |
| 6,496,858 | B1 | 12/2002 | Frailong et al. |
| 6,532,507 | B1 * | 3/2003 | Falik et al. ...... 710/107 |
| 6,553,408 | B1 | 4/2003 | Merrell et al. |
| 6,553,416 | B1 | 4/2003 | Chari et al. |
| 6,560,222 | B1 | 5/2003 | Pounds et al. |
| 6,578,042 | B2 | 6/2003 | Arrouye et al. |
| 6,601,084 | B1 | 7/2003 | Bhaskaran et al. |
| 6,651,190 | B1 | 11/2003 | Worley et al. |
| 6,654,796 | B1 | 11/2003 | Slater et al. |
| 6,654,891 | B1 | 11/2003 | Borsato et al. |
| 6,662,221 | B1 | 12/2003 | Gonda et al. |
| 6,678,826 | B1 | 1/2004 | Kelly et al. |
| 6,678,827 | B1 | 1/2004 | Rothermel et al. |
| 6,684,241 | B1 | 1/2004 | Sandick et al. |
| 6,697,947 | B1 | 2/2004 | Matyas, Jr. et al. |
| 6,700,890 | B1 | 3/2004 | Langley et al. |
| 6,711,613 | B1 | 3/2004 | Ewing et al. |
| 6,735,702 | B1 | 5/2004 | Yavatkar et al. |
| 6,751,677 | B1 | 6/2004 | Ilnicki et al. |
| 6,754,831 | B2 | 6/2004 | Brownell |
| 6,757,297 | B1 | 6/2004 | Chin |
| 6,859,841 | B2 * | 2/2005 | Narad et al. ...... 709/236 |
| 6,894,994 | B1 | 5/2005 | Grob et al. |
| 6,894,999 | B1 | 5/2005 | Acharya |
| 6,954,864 | B2 * | 10/2005 | Schelling ...... 713/310 |
| 6,970,924 | B1 | 11/2005 | Chu et al. |
| 6,973,491 | B1 | 12/2005 | Staveley et al. |
| 6,982,953 | B1 | 1/2006 | Swales |
| 7,024,695 | B1 | 4/2006 | Kumar et al. |
| 7,028,228 | B1 | 4/2006 | Lovy et al. |
| 7,058,740 | B2 * | 6/2006 | Watanabe et al. ...... 710/110 |
| 7,099,934 | B1 | 8/2006 | Ewing et al. |
| 7,120,692 | B2 * | 10/2006 | Hesselink et al. ...... 709/225 |
| 7,231,661 | B1 | 6/2007 | Villavicencio et al. |
| 7,441,043 | B1 | 10/2008 | Henry et al. |
| 7,457,857 | B1 | 11/2008 | Crayford et al. |
| 7,457,858 | B1 | 11/2008 | Levesque |
| 7,519,826 | B2 | 4/2009 | Carley |
| 2001/0056548 | A1 | 12/2001 | Blumberg |
| 2002/0001302 | A1 | 1/2002 | Pickett |
| 2002/0029337 | A1 | 3/2002 | Sudia et al. |
| 2002/0052850 | A1 | 5/2002 | Saito |
| 2002/0052950 | A1 | 5/2002 | Pillai et al. |
| 2002/0057018 | A1 | 5/2002 | Branscomb et al. |
| 2002/0064149 | A1 | 5/2002 | Elliott et al. |
| 2002/0078301 | A1 | 6/2002 | Burnett |
| 2002/0116485 | A1 | 8/2002 | Black et al. |
| 2002/0133708 | A1 | 9/2002 | Gudorf et al. |
| 2002/0162005 | A1 | 10/2002 | Ueda et al. |
| 2002/0165961 | A1 | 11/2002 | Everdell et al. |
| 2003/0023854 | A1 | 1/2003 | Novak et al. |
| 2003/0041136 | A1 | 2/2003 | Cheline et al. |
| 2003/0088513 | A1 | 5/2003 | Gritzmacher et al. |
| 2003/0093244 | A1 | 5/2003 | Corlett et al. |
| 2003/0093563 | A1 | 5/2003 | Young et al. |
| 2003/0097444 | A1 | 5/2003 | Dutta et al. |
| 2003/0120822 | A1 | 6/2003 | Langrind et al. |
| 2003/0156740 | A1 | 8/2003 | Siegel et al. |
| 2003/0191857 | A1 | 10/2003 | Terrell et al. |
| 2003/0221011 | A1 | 11/2003 | Shitano |
| 2004/0003071 | A1 | 1/2004 | Mathew et al. |
| 2004/0104266 | A1 | 6/2004 | Bolle et al. |
| 2004/0153552 | A1 | 8/2004 | Trossen et al. |
| 2004/0162906 | A1 | 8/2004 | Griffin et al. |

OTHER PUBLICATIONS

Ravi Sandhu et al.; Usage Control: A Vision for Next Generation Access Control.

Gail-Joon Ahn et al.; Role-based Authorization Constraints Specification; ACM Transactions on Information and System Security, vol. 3, No. 4, Nov. 2000, pp. 207-226.

Hardware you need FAST; Symbiat (online); Copyright 2002; pp. 1-2 specifically p. 1.

Hari Harikrishnan: Advanced security for data, voice and video access ideal for small offices and teleworkers; introducing Cisco 836 and SOHO 96 Secure Broadband Routers, Cisco.com: Mar. 2003; pp. 1-14, specifically pp. 4, 6 & 10.

PCT Search Report and Written Opinion; Application No. PCT/US04/34707; date of mailing Jul. 8, 2008; 7 pages.

A Model for Multilevel Security in Computer Networks; Lu et al.; IEEE Transactions on Software Engineering, vol. 16., No. 6; Jun. 1990; pp. 647-659;13 pages.

Better Security via Smarter Devices; Ganger et al.; 2001 IEEE, pp. 100-105; 6 pages.

USPTO Office Action; U.S. Appl. No. 11/611,210; date mailed Jul. 20, 2009.

USPTO Office Action; U.S. Appl. No. 10/461,820; date mailed Jul. 5, 2005.

USPTO Office Action; U.S. Appl. No. 10/461,820; date mailed Feb. 24, 2006.

USPTO Office Action; U.S. Appl. No. 10/461,820 date mailed Jun. 9, 2004.

USPTO Office Action; U.S. Appl. No. 10/969,661; date mailed Nov. 2, 2006.

USPTO Office Action; U.S. Appl. No. 10/461,827; date mailed Mar. 26, 2008.

USPTO Office Action; U.S. Appl. No. 10/461,827; date mailed Oct. 3, 2007.

USPTO Office Action; U.S. Appl. No. 10/461,827; date mailed Nov. 28, 2006.

USPTO Office Action; U.S. Appl. No. 10/461,827; date mailed May 8, 2006.

USPTO Office Action; U.S. Appl. No. 10/461,827; date mailed Oct. 5, 2008.

USPTO Office Action; U.S. Appl. No. 11/611,210; date mailed Oct. 8, 2010, 24 pages.

USPTO Office Action; U.S. Appl. No. 12/394,342; date mailed Jul. 1, 2010, 14 pages.

USPTO Office Action; U.S. Appl. No. 11/946,976; date mailed Oct. 1, 2010, 24 pages.

Office Action in U.S. Appl. No. 11/611,210 issued May 23, 2011, 24 pages.

ARN, Advanced Remote Node, Workgroup products; Nortel Networks; copyright 1999; pp. 1-16, specifically p. 9.

USPTO Office Action ; U.S. Appl. No. 12/352,161 date mailed Jul. 23, 2010.

* cited by examiner

SECURE MANAGEMENT ACCESS CONTROL FOR COMPUTERS, EMBEDDED AND CARD EMBODIMENT

CROSS-REFERENCE TO RELATED APPLICATIONS

This application is a continuation of U.S. patent application Ser. No. 10/969,561, filed Oct. 20, 2004, which in turn is a continuation-in-part of U.S. patent application Ser. No. 10/461,827, filed Jun. 13, 2003. U.S. patent application Ser. No. 10/969,561 also claims the benefit of U.S. Provisional Application No. 60/512,777, filed Oct. 21, 2003. U.S. patent application Ser. No. 10/461,827 in turn claims the benefit of U.S. Provisional Application No. 60/388,287, filed Jun. 13, 2002, and U.S. Provisional Application No. 60/438,282, filed Jan. 6, 2003. The present invention is related to the invention described in co-owned U.S. Pat. No. 7,171,467, filed on Jun. 13, 2003 and issued on Jan. 30, 2007, which is incorporated herein by reference. The present invention is also related to the invention described in co-owned and co-pending U.S. patent application Ser. No. 11/611,210, filed on Dec. 15, 2006, which is incorporated herein by reference.

FIELD OF THE INVENTION

The present invention relates in general to methods and apparatus used in managing devices or systems in a communication network and more particularly to methods and apparatus for remote management of these devices or systems in a secure manner.

BACKGROUND OF THE INVENTION

In distributed computer networks the vast majority of the networking elements are not in the same geographic location or easily accessible by the skilled technicians or network administrators typically responsible for normal maintenance of the elements. Not only do these technicians and administrators require regular access to the network elements for maintenance, but they also need timely access to the network elements when problems arise in order to perform trouble shooting and resolving problems. The more quickly a network administrator can access the elements in the network for troubleshooting the shorter the mean-time-to-repair (MTTR) an outage in the network.

In general, it is not practical to require physical access to the systems for general maintenance or troubleshooting and repair. The costs would be prohibitive, both in time and personal, to require a skilled technician to be dispatched for every required activity on a system. This has driven a strong requirement to provide for remote management of network elements and servers. A number of means have been developed to provide for remote management of these systems. Remote management of the elements can be provided in-band (the remote administrator communicates with the system using the same network as the user data for the managed system) or out-of-band (the remote administrator communicates with the system using a means other than the network utilized by the user data of the managed system). Typically, when out-of-band remote management is utilized, the administrator is connecting to a console or management port on the system.

However, the security of the network elements and servers is a concern when remote management is allowed. For a system to be secure, it must first of all be physically secure from attack. Without physical security, it is almost certain an attacker can compromise a system. If management of the system requires physical access to the system then the security of the management is as strong as the physical security. But, as stated above, in most networks this is not practical. It is important, though, to realize that opening up a device to remote management allows a larger window for attackers to utilize in an attack. The use and security of remote management must be carefully considered.

The struggle to find a workable compromise between the utility of remote management of devices and the need to maintain the security of the devices can clearly be seen in "The Router Security Configuration Guide" published by the National Security Agency. On page 49 of the guide it is recommended that a terminal (or computer) be a stand-alone device protected from unauthorized access. This goes back to requiring physical access to the network element in order to access the console or management port. On page 47 the guide also states, "Permitting direct dial-in to any vital piece of network infrastructure is potentially very risky . . . " In-band management methods often depend to one degree or another on the security of the network the element is a part of to protect the management traffic. While this MIGHT provide a reasonable level of protection from external attacks (initiated from outside the network), it generally will not provide a sufficient level of protection from an internal attack (initiated from inside a network). To help reduce the vulnerability to internal attack, the "The Router Security Configuration Guide" has recommendation using a dedicated network or at least dedicated network segments for remote network administration of routers. Building out a dedicated network for management would be quite expensive for most networks.

There are definite advantages to having an out-of-band remote management connection to network elements that utilize connectivity that is diverse from the primary network connection. One of the primary purposes of the remote management connection is to assist the remote administrator or technician in troubleshooting network problems. With in-band management, if a network problem has hindered connectivity to a network element, management connectivity to that element could be lost when it is needed the most. An out-of-band management solution is more likely to allow the administrator or technician to still remotely access the network element to troubleshoot and resolve the network problem in a timely manner. Also, the out-of-band management connection providing connectivity to the console or management port of an element might be available for the initial configuration of the device whereas an in-band management connection might not be available for initial configuration. It is also possible that some functions can only be performed using the console or management port of the element. An example of this would be Password Recovery on a Cisco router. While a dedicated and secure out-of-band network would be the most preferable solution for out-of-band management from a security standpoint, the cost of such a solution is generally prohibitive. While some form of public shared network, such as the Public Switched Telephone Network (PSTN) or an Integrated Services Digital Network (ISDN) provides the most cost effective solution for a diverse out-of-band connection, the security of such solutions is a major concern.

The most straightforward means of providing out-of-band connectivity to a network element is to place a modem on the console port of a networking element connecting it to the PSTN. However, any perimeter security for the network such as firewalls and access-lists has just been completely bypassed, providing a vulnerable point for intruders to attack. If an attacker knows or can determine the phone number of the modem then the only security is the logon protection on the networking element itself. War dialers will generally find phone numbers connected to modems.

It is important to realize that most protocols used for assisting in the remote management of network elements do not provide for the confidentiality or integrity of the information being transmitted between the remote administrator and the network element or strong authentication of the parties involved. This is especially critical if a public shared network such as the PSTN is utilized for the out-of-band connectivity. For instance, the protocol most frequently utilized for remote login to network elements (Telnet) transmits traffic in the clear (any one who can tap into or sniff the network can capture and understand the traffic). It would not be uncommon for a remote administrator to be transmitting passwords and device configurations over such a connection. If an attacker were able to insert himself in the middle of such a connection, even more attacks would be possible.

In order to control the cost of remote management solutions, user traffic and management traffic are being commingled at multiple locations throughout the management path. The use of the user data network for the transport of management traffic is one place this commingling of data occurs. There is also a commingling of user and management data in the device itself. User traffic and device management traffic comes in over the same user interface, uses the same memory and buffers, and is processed by the same processor. The commingling of user traffic and management traffic can compromise the security of the device management.

Maintenance and troubleshooting of network element problems can often be facilitated by having the element maintain an accurate time clock. One way of keeping the clock accurate on an element is to allow the network to set the clock utilizing a protocol such as Network Time Protocol (NTP). If an attacker were able to alter or interfere with NTP, the smooth operation of the network could be interfered with.

Some network elements utilize Hypertext Transfer Protocol (HTTP) or Hypertext Transfer Protocol over Secure Socket Layer (HTTPS) for managing the network element. HTTP transmits information in the clear and is susceptible to impersonation and data compromise. Often HTTPS is only authenticating the server to the client. For remote management, mutual authentication can be important.

A common difficulty in maintaining the elements of a network is keeping the software on the elements updated with patches that protect them from new exploits by hackers and crackers. One of the functions of firewalls is to protect the elements behind them from these exploits so that it is not as critical to keep protected elements updated. However, this does require the firewalls to be updated regularly to protect the elements from new exploits. Keeping the firewalls updated can be difficult.

Some of these concerns can be addressed by technology existing today. A firewall/Virtual Private Network (VPN) appliance could be utilized to protect management traffic that flows from a user interface on the managed device to a central location providing services for the management of the device. This would protect the management data while it flows over the in-band network. A terminal server could be utilized to allow an administrator to dial into the managed device over an out-of-band network. Some terminal servers will even allow the connection from the administrator to the terminal server to be encrypted for protection of the management data. However, this does not solve all the concerns. The terminal server does not fully support a centralized mechanism to verify an administrator should have access to the managed device, especially if the in-band network is down. The VPN/Firewall does not support connection to the console port of the managed device. Even having both a VPN/Firewall and a terminal server would leave gaps in the protection.

It would take a number of different devices configured to work together to address most of the concerns. This would require a number of additional devices in an environment where rack space is very expensive. Having another two or three devices in the rack is quite expensive in more ways than just the cost of the equipment.

An object of the invention is to provide for the secure management of devices without requiring additional devices taking up additional rack space by embedding the necessary hardware and software for secure management of the device in the device to be managed.

Another object of the invention is to separate user traffic from device management traffic, logically and/or physically, both in the device and while in transit over a network.

Another object of the invention is to establish a network enabled management interface for the secure remote management of the device. While similar to a console interface, the secure interface is to be engineered to secure remote access.

Another object of the invention is to define a virtual management interface for controlling management traffic that will flow over the in-band interfaces. The virtual management interface provides for logical separation of the management data from the user data even when the management data and the user data will transit the same physical network.

Another object of the invention is to utilize standard packet filtering firewall methods to restrict access to the management interfaces of the device, both real and virtual, based on factors such as the source address of the connection request.

Another object of the invention is to use a means of authentication, including the possibility of strong authentication, to verify the identity of the administrator and restrict access to the management interfaces based on the identity of the administrator.

Another object of the invention is to use an Access Control Server (ACS) to allow for centralized authentication and authorization of administrators as well as to log accounting information.

Another object of the invention is to restrict functions and protocols allowed to access the management interfaces to those necessary for remote management of that network element.

Another object of the invention is to dynamically update the rules used for restricting access to the management interfaces.

Another object of the invention is to provide for the confidentiality and integrity of the information transmitted between the remote administrator and the management interfaces.

Another object of the invention is to monitor the management interfaces for proper functioning and alert management software upon failure.

Another object of the invention is to monitor management interfaces for possible attacks and report possible attacks to Intrusion Detection System management software.

Another object of the invention is to provide for secure connections to a network providing network services both utilizing the managed device's user data connections and over a dedicated secure network enabled management connection.

Another object of the invention is to access network services such as ACS, Domain Name Server (DNS), NTP, Network Management Stations, Logging Servers, and Intrusion Detection Systems management stations over either an in-band network connection or over the network enabled management connection (or both) and dynamically switch between which network is being utilized for the service.

Another object of the invention is to allow a remote administrator or technician to access the management interfaces via either an in-band connection or a network enabled management connection (or both).

Yet another object of the invention is to provide auditing information about attempted connections (successful and unsuccessful) to the management interfaces.

Yet another object of the invention is to alert management software on unsuccessful attempts to connect to management interfaces.

Yet another object of the invention is to be able to securely manage the device through in-band connections to the virtual management interface, the network enabled management connection, or the console port.

A further object of the invention is to enable securing a plurality of management protocols for managing the device, both over in-band connections to the virtual management interface and over the secure network enabled management connection. Exemplary protocols to be secured include telnet, ssh, http, https, snmp, dns, tftp, ftp, ntp, and xml.

A further object of the invention is to provide the end-point for an in-band or out-of-band connection between the network segments providing network services and the management interfaces on the managed devices which can be secured using protocols such as IPSec or may be unsecured.

A further object of the invention is to provide the ability for the managed device to switch which management path is being utilized for management network services, in particular, the managed device can utilize in-band connections for management network services when available and switch to using a network enabled management connection for management network services when an in-band connection is not available.

A further objective of the invention is to enable the secure management of other devices that are collocated with the managed device.

A further objective of the invention is to provide for the ability to easily upgrade existing hardware to support secure management of the device.

Finally, it is an object of the present invention to accomplish the foregoing objectives in a simple and cost effective manner.

BRIEF SUMMARY OF THE INVENTION

The present invention addresses the foregoing problems, as well as other problems, by providing an exemplary embodiment of a Secure Management Access Control for Computer Chipset (SMACC) for inclusion in devices that are to be enabled for remote management. In this preferred exemplary embodiment, the SMACC functions are implemented on a separate processor with separate flash and memory; however, this is not intended to limit the implementation of these features to separate chipsets in a device. These features also can be combined with other hardware and software features such as being integrated with a modem or with the main processor of a device. Some of the features of the SMACC can also be implemented separately. Such implementations would still be within the spirit and scope of this invention.

An additional exemplary embodiment of the invention implements the SMACC processor and supporting chips on a card that can be inserted into the device to be managed. In this implementation, management of the device is controlled by the card and the administrator must connect to the card to manage the device. The administrator will be able to connect to the SMACC card through the Virtual Management Interface (VMI) or directly through a SMACC interface on the SMACC card.

A primary function of the SMACC is to provide for the separation of management data from user data both within the device being managed and while the management information is in transit. Within the device, the SMACC sets up a separate processor for receiving management information and interacting with the control functions of the device. Remote management functions will pass through the SMACC processor. The SMACC also provides for a separate interface for management functions that is network enabled to facilitate remote management. Various embodiments of the invention allow for different types of interfaces to be utilized for the network enabled management interfaces. Exemplary interfaces could include POTS connections to the PSTN, Packet Cellular connections to a cellular provider's infrastructure, an Ethernet interface to a broadband modem and the Internet, or a wireless connection. The types of interfaces are not limited to those in this list to be within the scope of this invention. A VMI is also established for logically separating management traffic from user data when the in-band path is to be used for management data. The VMI is the interface between the SMACC chipset and the user data interfaces. The VMI utilizes existing and developing technology such as VPN to build secure tunnels between the SMACC chipset and the management center while utilizing the user data interfaces of the managed device and the user network to provide the transport of the management data cost effectively. The VPN technology provides the logical separation, confidentiality, and integrity of the management traffic while it is in transit.

Another primary function of the SMACC is to protect the management interfaces from attack. This is accomplished through a combination of firewall, VPN, and authentication and authorization applications. The SMACC chipset implements the logic to support VPN tunnels to the management center, thus protecting the management traffic between the management interface on the SMACC (VMI or SMACC interface) and the management center. The firewall functionality protects the SMACC chipset from access by unauthorized parties, both internal and external, and from unauthorized protocols. An exemplary embodiment of the SMACC can be configured to only allow the protocols necessary for managing the device to access the SMACC. No other protocols will be allowed through the interface. The authentication and authorization of administrators can either be configured and accomplished locally to the SMACC, and/or centralized services can be accessed at the management center utilizing the secure management interfaces to the management center (VMI or SMACC interface). The SMACC implements the client protocol for exemplary services such a Remote Authentication Dial-In User Service (RADIUS) protocol Terminal Access Controller Access Control System (TACACS+), or Lightweight Directory Access Protocol (LDAP).

The SMACC allows the use of shared networks including public networks such as the Internet, the Public Switched Telephone Network (PSTN), or a corporate backbone network for secure network management while still providing for the confidentiality, integrity, and logical separation of the management data. In an exemplary embodiment, this is accomplished by utilizing Virtual Private Networking (VPN) technology to build secure tunnels between one or more management interface on the SMACC and the management center providing network resources for management. The VPN tunnels provide for logical separation of the management traffic from any other traffic utilizing the network. The VPN tunnels also utilize encryption to provide for the confidentiality and integrity of the management traffic utilizing the network. SMACC increases both the security and the availability of remote management of devices.

The SMACC allows for access controls both on what remote devices can connect to the management interfaces of the SMACC (and can therefore access the management functions of the managed device), and what administrators (users) are allowed to connect to the management interfaces of the SMACC. In an exemplary embodiment of the invention, what devices are allowed to connect to the SMACC can be filtered by network level addresses such as Internet Protocol (IP) addresses or calling telephone numbers, as well as by presenting valid credentials such as a certificate or proof of a shared secrete. Administrators can also be challenged for valid credentials and authorization. The SMACC can check these credentials either in a locally maintained database on the SMACC or by utilizing centralized authentication services at the management center. The SMACC optionally implements one or more authentication clients such as a RADIUS, TACACS+, or LDAP client to utilize the centralized authentication services.

In a preferred exemplary embodiment of the SMACC, the SMACC can be configured to monitor the various management interfaces for connectivity and report the loss of connectivity to the management center. This includes interfaces that are to be available even if they are not currently being utilized to transport management data. One example of this is when a POTS line is connected to a SMACC interface and is configured to be a backup for management data if the connection to the management center via the VMI is not available. In this situation, the SMACC can be configured to be checking the available of the connection to the PSTN even when it is not being utilized for management data. It is critical for that POTS connection to be there if it is needed. Other types of interfaces can also be checked for availability by the SMACC processor. If the SMACC detects a management interface that it is monitoring as being unavailable, it reports this to the management center over another available management interface using protocols such as Simple Network Management Protocol (SNMP), trap or syslog.

In a preferred exemplary embodiment of the SMACC, the SMACC can utilize network services to provide a centralized and scalable solution for secure remote management of the network. Some of the network services accessed can include an ACS to provide for centralized authentication and authorization at the user level, a NTP server to provide time synchronization for the managed device, a DNS to provide secure name resolution for the managed device, a logging server to provide for centralized logging, a network management station to provide for centralized management of the managed device utilizing a protocol such as SNMP, and an intrusion detection/prevention management system.

The SMACC implements the clients to access and utilize these services. The SMACC can access the centralized service via the VMI and through a connection to the backbone network (or an operations support network) or via a SMACC interface through an out-of-band network, such as the PSTN or a packet cellular network, to the management center. In a preferred exemplary embodiment of the SMACC, the clients running on the SMACC can access the servers at the management center over any available management interface and the interface being utilized can change depending on the conditions at the time.

The SMACC may have information it can configure to send to the management center concerning its own operation and the operation of the managed device (or proxy managed devices). This information can be sent to the management center utilizing protocols such as SNMP traps, or remote syslog records as well as other possible proprietary or stands based protocols. The SMACC will utilize the first available management interface in a preferred priority list for transporting this information back to the management center. This information can include auditing information, operational information, and alerts as well as other possible information.

A preferred exemplary embodiment of the SMACC will detect attempts to access the management interfaces by unauthorized systems or users. The SMACC can be configured to report these attempts to the management center. The SMACC can also be configured to detect and report attempts to utilize unauthorized protocols to access the management interfaces to the SMACC.

An exemplary embodiment of the SMACC enables remote administrators to access the managed device via the SMACC by first accessing the management center and then connecting to the SMACC via the secure tunnel from the management center to the SMACC. The plurality of possible paths may exist from the management center to the SMACC, both utilizing the VMI on the SMACC and SMACC interfaces on the SMACC. The remote administrator will be able to utilize any of these interfaces to connect from the management center to the SMACC.

A variety of exemplary embodiments are possible supporting various protocols for the management of the managed device via the SMACC. These protocols can utilize any of the SMACC management interfaces. Example management protocols that can be supported include: telnet, ssh, http, https, snmp, dns, tftp, fip, ntp, and xml. This is not intended to be an exhaustive list of possible protocols for which there might be requirements for supporting for the management of a device.

An additional exemplary embodiment of the SMACC allows the SMACC processor to be utilized as a secure management proxy for other devices collocated with the device containing the SMACC. User interfaces on the managed device can be specified as proxy management interfaces. Proxy Management Interfaces can be either Console Interfaces or Dedicated Management Segments and will connect to a proxy managed device. A proxy managed device does not have a SMACC, but is being managed via a collocated device that does have a SMACC. Since the communications between the proxy managed device and the SMACC enabled device may not be secure, it can be important for the proxy managed device and the SMACC enabled device to be physically secured together.

The SMACC processor will control data in and out of the interfaces configured as proxy management interfaces for the passing of management information between the proxy managed device and the SMACC. In a preferred exemplary embodiment, proxy console management interfaces will be restricted to management data only and will be serial interfaces providing a terminal emulation program type of access to the console or management interface on the proxy managed device collocated with the SMACC enabled device. In an exemplary embodiment of the invention, the proxy dedicated management segment is also restricted to management data only in order to provide for physical separation of management data from user data, however, an additional exemplary embodiment of the invention would allow the segment to support both user data and management data. In the exemplary embodiment in which the management segment will support both management data and user data, the SMACC and optionally support utilizing VPN technology to logically separate the management data from user data. The VPN technology could also be utilized to ensure confidentiality and integrity of the management data between the SMACC and the proxy managed device.

In a preferred exemplary embodiment of the SMACC that supports proxy management of collocated devices, the SMACC can implement both application level proxies for the management protocols to be supported as well as an application level tunnel for passing management traffic between the proxy managed device and the management center.

An additional exemplary embodiment of the current invention implements the SMACC chipset on a card that can be connected to a system. In the illustrated exemplary embodiment, the card connects to the managed system via a Peripheral Component Interconnect (PCI) bus, but this should not be taken to limit the current invention to a PCI implementation. Any connection of the card to a system to be managed is within the scope of the current invention. The use of a card connecting to a system provides for greater opportunity to utilize the SMACC with existing hardware and hardware designs.

The SMACC provides for the separation of management data from user data both in the device being managed and while the management data is in transit. Since there is a very strong need for securing remote management and for separating management data from user data, yet this has not been done primarily because it has been considered too expensive to implement, this invention is clearly not obvious to one of ordinary skill in this area. This invention combines existing building blocks along with additional new and innovative features and concepts to solve the shortcomings in remote management in an integrated and affordable solution.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
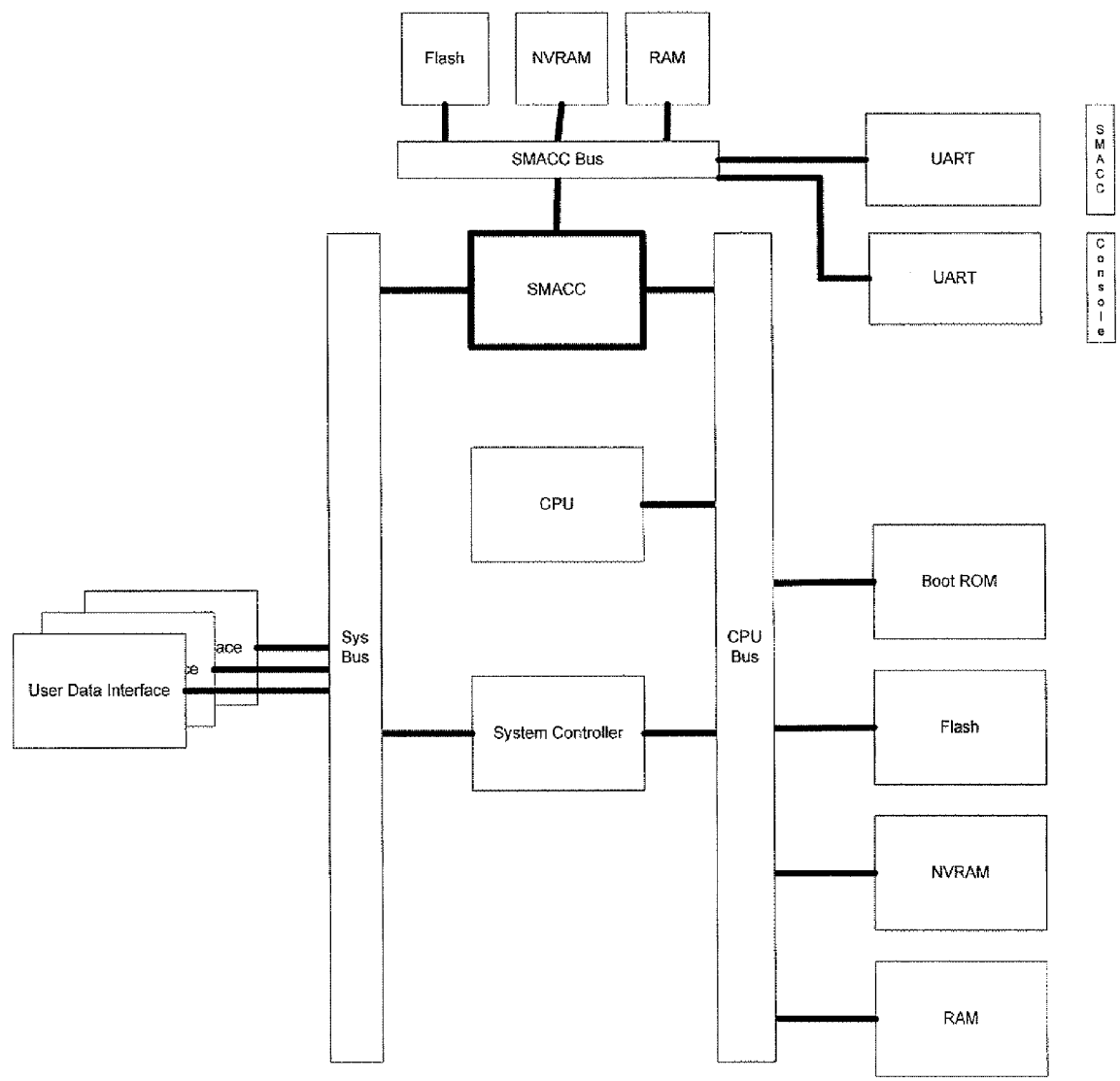
FIG. 1 is a block diagram for an exemplary embodiment of the embedded SMACC chips set within a device to be monitored.
Figure 14:
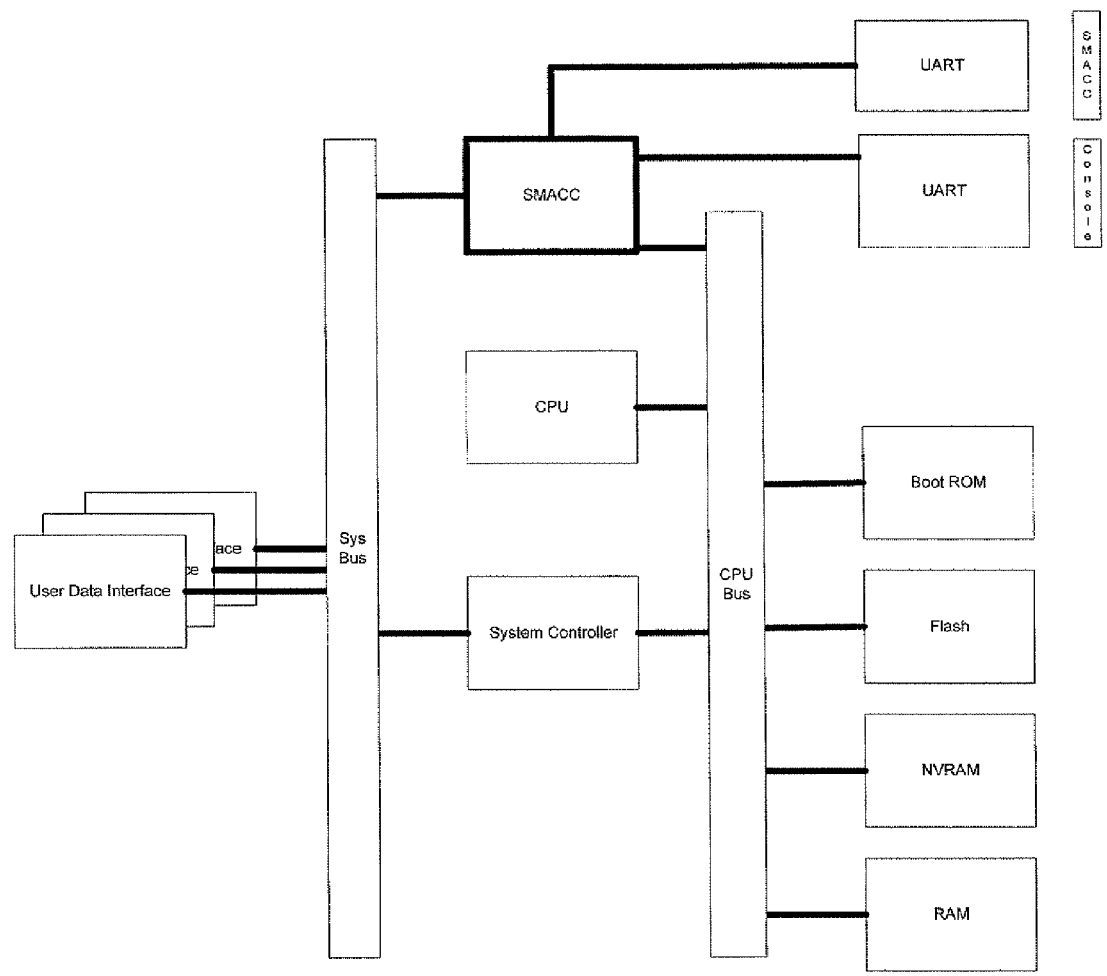
FIG. 14 is a block diagram of an exemplary embodiment of the embedded SMACC chipset without dedicated flash, NVRAM, or RAM chips.
Figure 28:
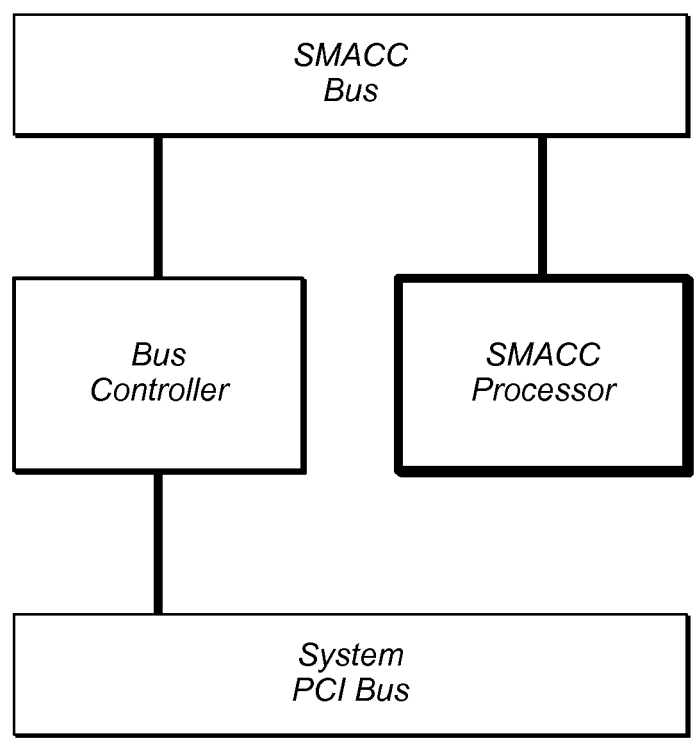
FIG. 28 is a block diagram of an exemplary embodiment of the SMACC processor connecting to a PCI bus in which a controller chip is required for the SMACC processor to access the PCI Bus.
Figure 29:
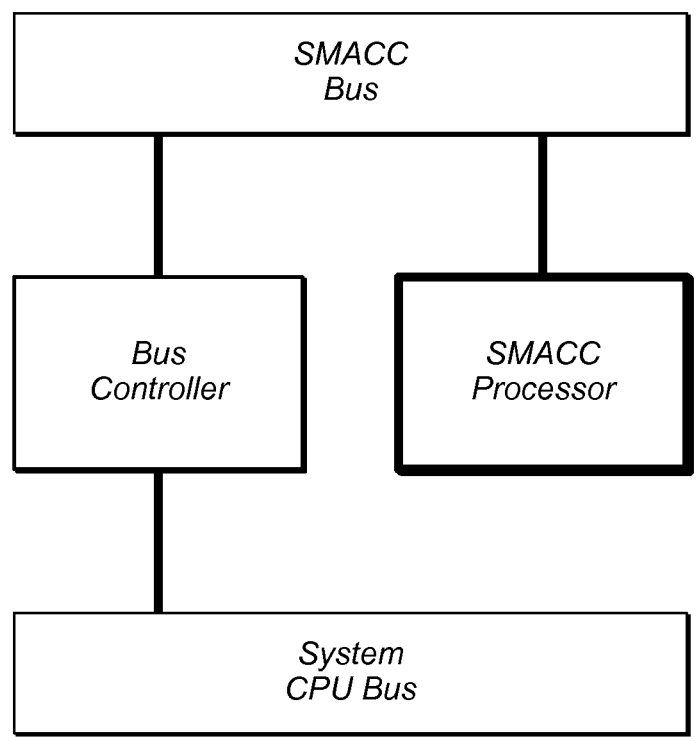
FIG. 29 is a block diagram of an exemplary embodiment of the SMACC processor connecting to the system Central Processing Unit (CPU) bus of the system the SMACC is being embedded in which a controller chip is required for the SMACC processor to access the system CPU bus.

FIG. 1 illustrates the positioning of the SMACC chipset within the managed device. In a preferred exemplary embodiment, the SMACC processor has its own flash, Non-Volatile Random Access Memory (NVRAM), and Random Access Memory (RAM) for operating, however, an alternative exemplary embodiment as illustrated in FIG. 14 is also possible in which the SMACC processor utilizes the same flash, NVRAM, and RAM chips as the main processor and such implementations are not excluded. In these exemplary embodiments, it may be necessary to utilize a controller chip for the SMACC processor to access the necessary bus as illustrated in FIGS. 28 and 29.

Figure 30:
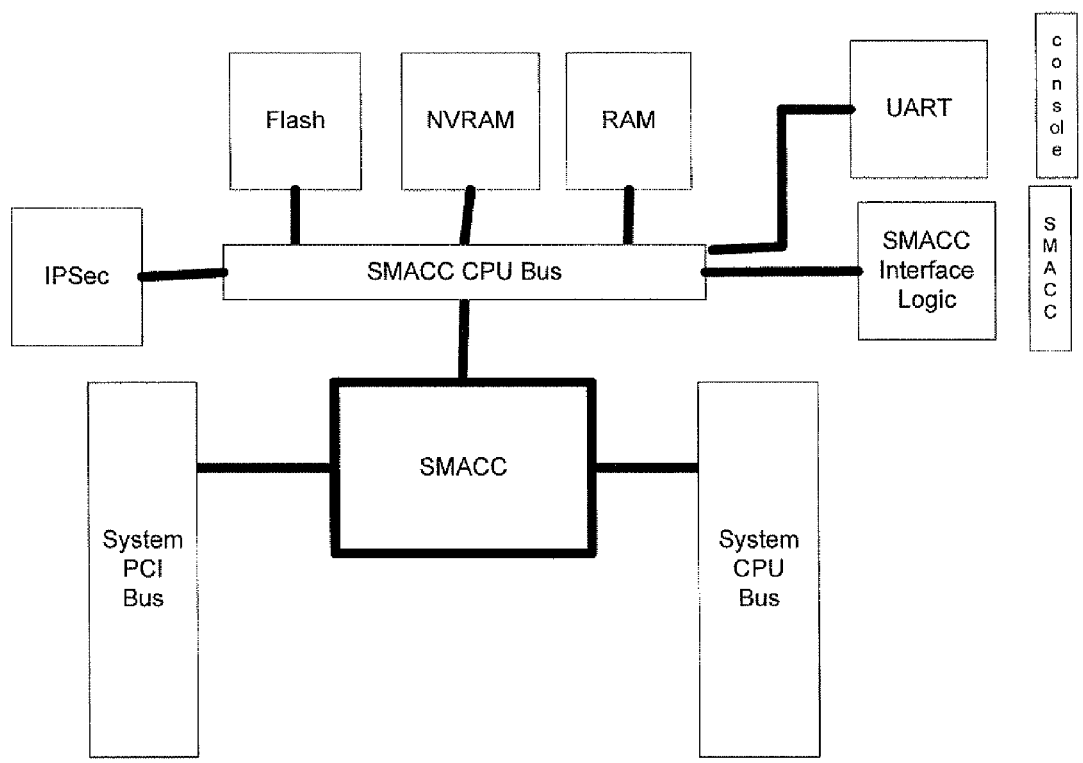
FIG. 30 is a block diagram of an exemplary embodiment of the SMACC chipset with an additional chip to implement the VPN technology.

The Flash chip is intended to safe the programs and microcode for the SMACC processor, the NVRAM to store operating parameters and configurations, and the RAM to act as the operating memory for the SMACC processor. It should be noted that additional chips can be included for additional security or to offload processing from the SMACC processor while still being included in the intent of this invention. An additional exemplary embodiment of the SMACC chipset, as illustrated in FIG. 30, included a dedicated chip for providing IPSec.

It is also likely in time that system on chip (SOC) capabilities will continue to expand to the point where it could be economical to use a processor for the SMACC processor that includes some or all of the flash, or NVRAM on the same chip as the SMACC processor. To do so is still considered to be within the scope of this invention.

Figure 2:
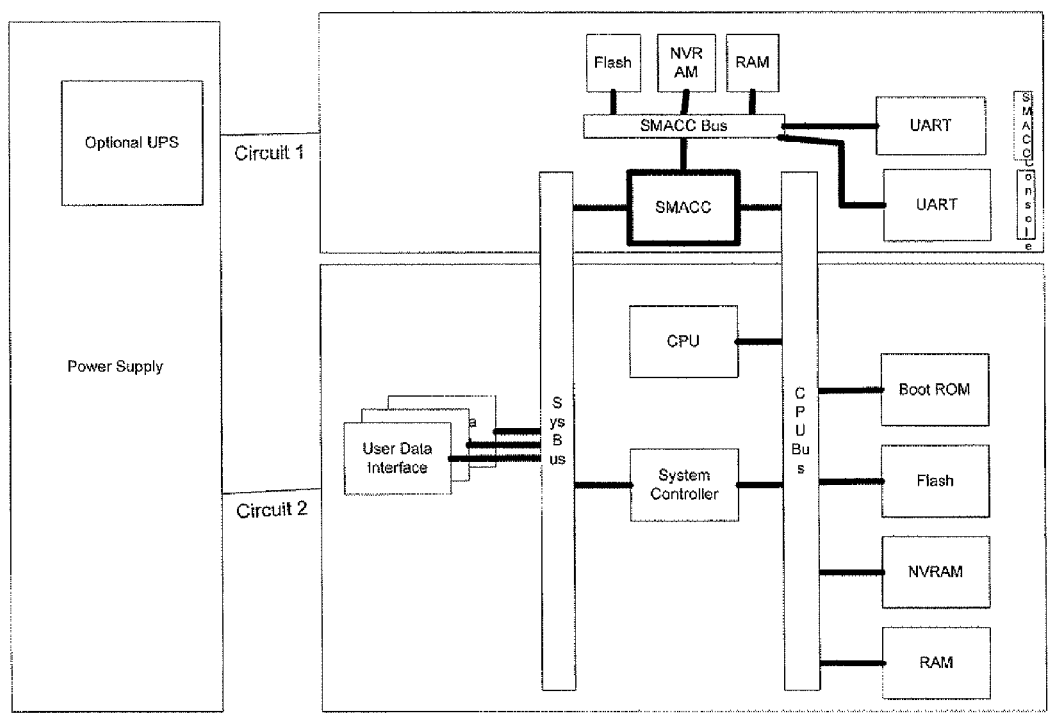
FIG. 2 is a block diagram for an exemplary embodiment of the embedded SMACC chip set within a device to be monitored along with a power supply.

FIG. 2 illustrates the option of the SMACC processor and supporting chips having a power circuit from the power supply that is different from the circuit utilized for the main processor of the SMACC enabled device. This would enable a couple of significant features. It would allow the inclusion of a small Uninterruptible Power Supply (UPS) that could then selectively provide power only to the SMACC when there is a power loss. The SMACC could then report the power loss over the SMACC interface that could still be operational even in the event of a loss of power (such as could be the case with a PSTN connection or if the SMACC interface is a cellular network connection). This way the UPS would not have to be large enough to provide power for the entire device while reporting the power outage. An additional feature enabled by a separate circuit for the SMACC chipset is the ability to reload and power cycle the SMACC chipset and the main device discreetly. The main device can be reloaded while the SMACC remains operational allowing for the secure remote monitoring and control of the device boot process over the SMACC interface. The SMACC processor can also be reloaded without the main device being reloaded at the same time.

Figure 31:
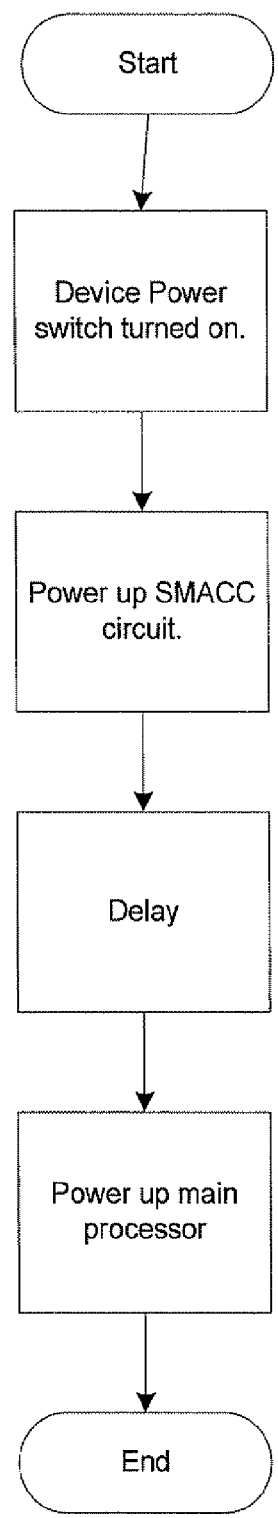
FIG. 31 illustrates an exemplary power up sequence for a system that has both a SMACC processor and a main processor.

A preferred exemplary embodiment as illustrated in FIG. 31 allows for the device to be configured such that on power up, the SMACC chipset receives power first and is allowed to load before the main device is powered up. This allows the main device boot process to be monitored over the SMACC interface on power up. An alternate exemplary embodiment provides for separate power switches for the two circuits such that they could be powered up separately. An additional exemplary embodiment includes separate connections to an external power source or outlets such that common remote power management solutions could be utilized to power up the SMACC separately from the main device.

Figure 3:
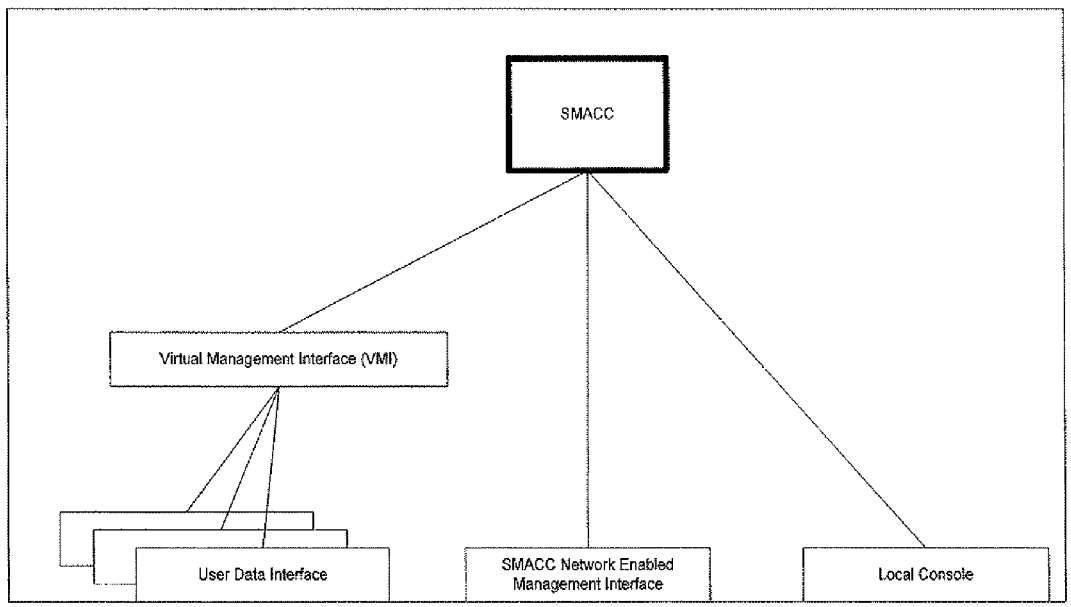
FIG. 3 illustrates the interfaces to the SMACC processor.

In a preferred exemplary embodiment of the SMACC, as shown in FIG. 3, the SMACC has two types of interfaces for transporting management traffic between the SMACC and the management center:

Virtual Management Interface (VMI)—logically separates management traffic from user data traffic when a user interface on the managed device is going to be utilized for the network connection, and SMACC Network Enabled Management Interface—provides a physically separate interface for the management network connection rather than the user interfaces on the managed device.

Virtual Management Interface (VMI)

The Virtual Management Interface (VMI) logically separates management traffic from user data when they are going to utilize the same interfaces on the managed device and the same physical network. In a preferred exemplary embodiment of the current invention, the VMI will utilize a Virtual Private Network (VPN) mechanism such as IPSec to encrypt, protect and logically separate the management traffic before the traffic is passed to the user interfaces. The managed device is designed such that management traffic is not allowed to be sent directly to the user interfaces. All management traffic must go through one of the management interfaces (the VMI or the SMACC interface). The VMI allows any of the user interfaces to be utilized for management traffic while still protecting the management interface and traffic.

SMACC Network Enabled Management Interface (SMACC Interface)

The SMACC interface is an interface that is dedicated for management traffic for management of the device. The SMACC interface is a network enabled interface and therefore is able to support the full range of protocols that are typically utilized for management of a device such as SNMP, Trivial File Transfer Protocol (TFTP), File Transfer Protocol (FTP), DNS, SysLog, Telnet, Secure Shell (SSH), or HTTP. The SMACC interface will also control access to the management functions of the device and protect the management traffic in transit through the utilization of VPN technology such as IPSec. The SMACC interface can be utilized to connect to a central location that provides for these network services as well as for remote administrator access.

Figure 9:
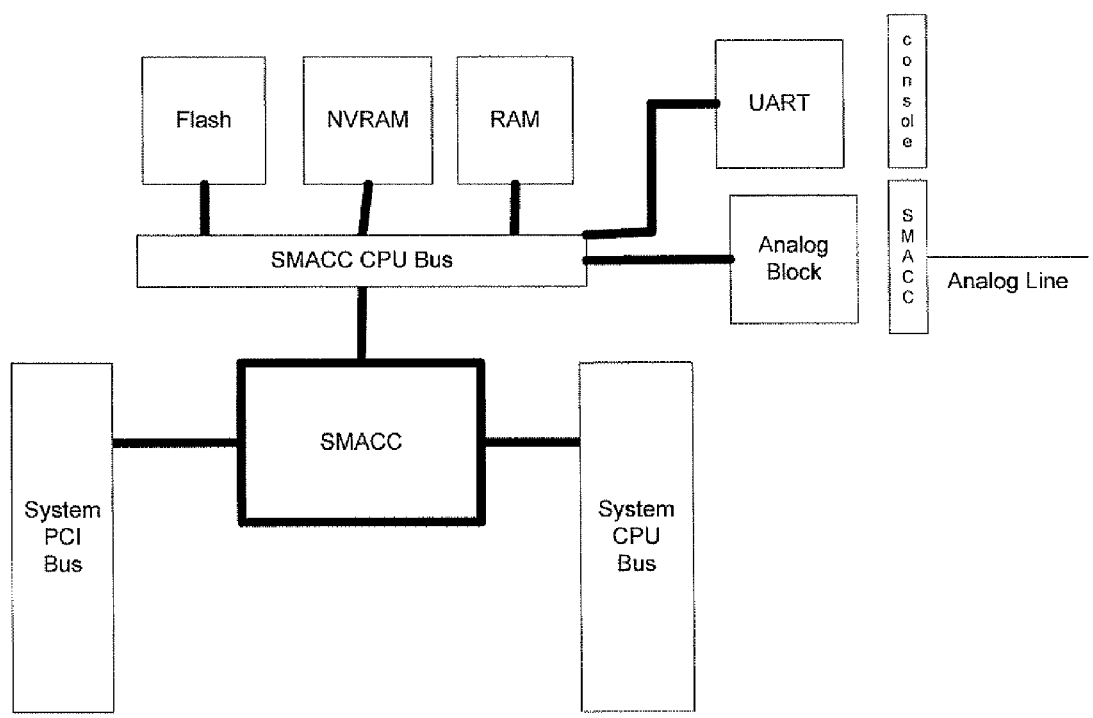
FIG. 9 is a block diagram of an exemplary embodiment of the embedded SMACC chipset including an integrated modem.
Figure 10:
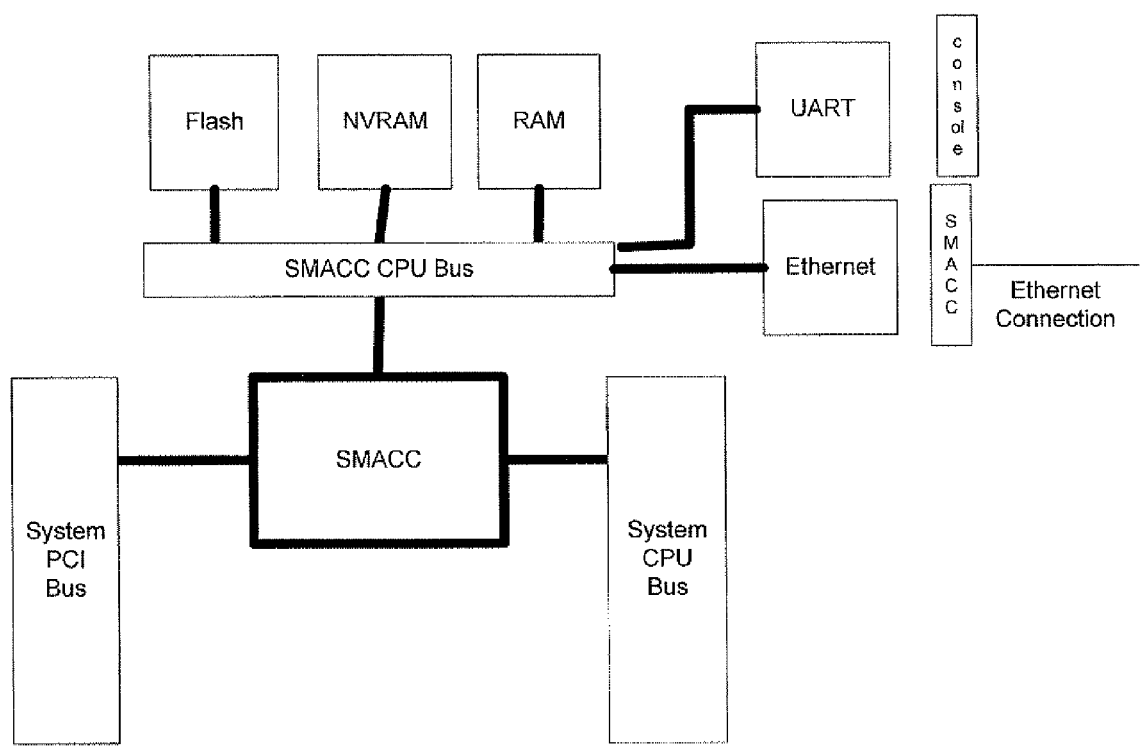
FIG. 10 is a block diagram of an exemplary embodiment of the embedded SMACC chipset including an Ethernet SMACC interface.
Figure 11:
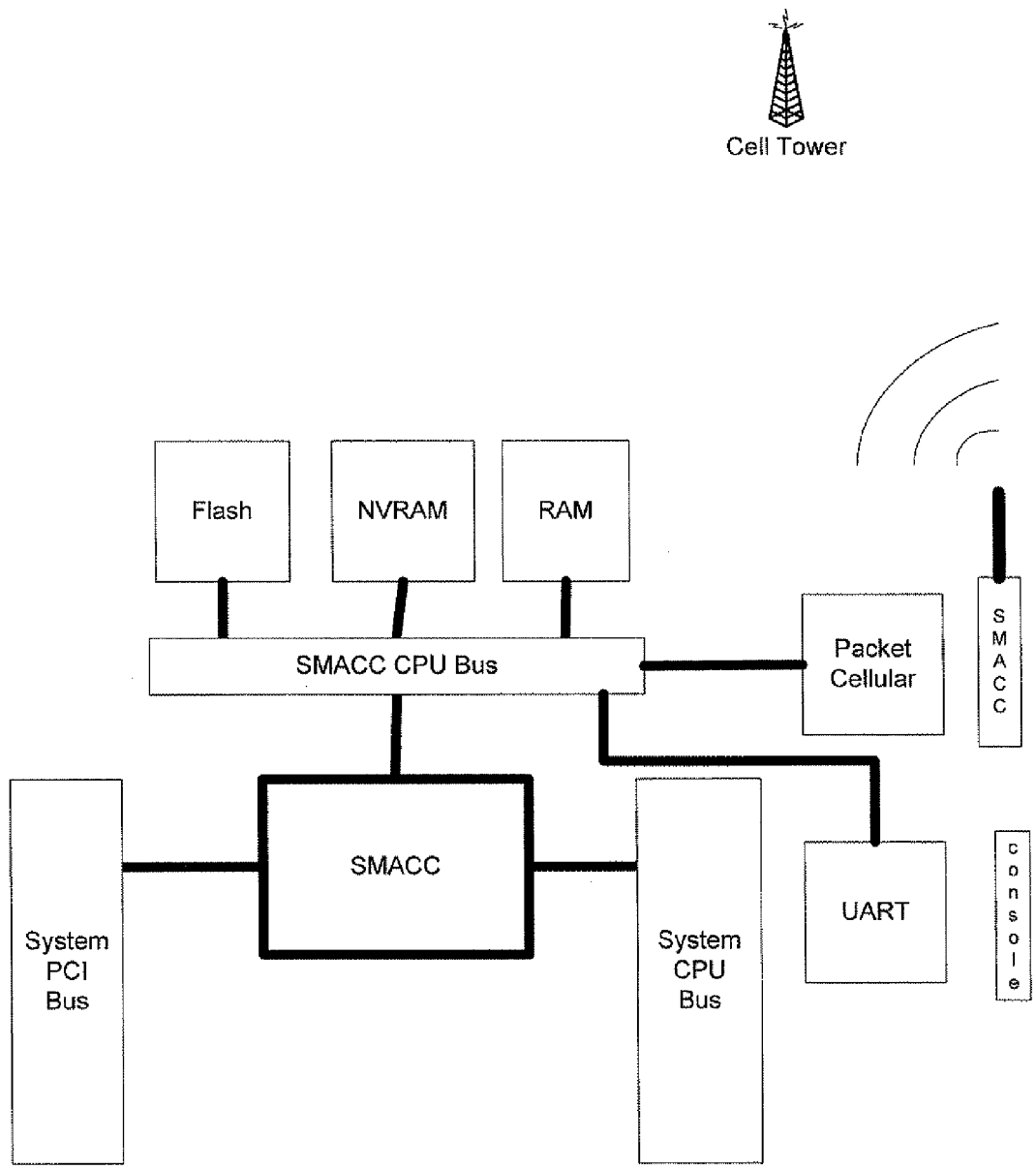
FIG. 11 is a block diagram of an exemplary embodiment of the embedded SMACC chipset including an integrated packet cellular interface.
Figure 12:
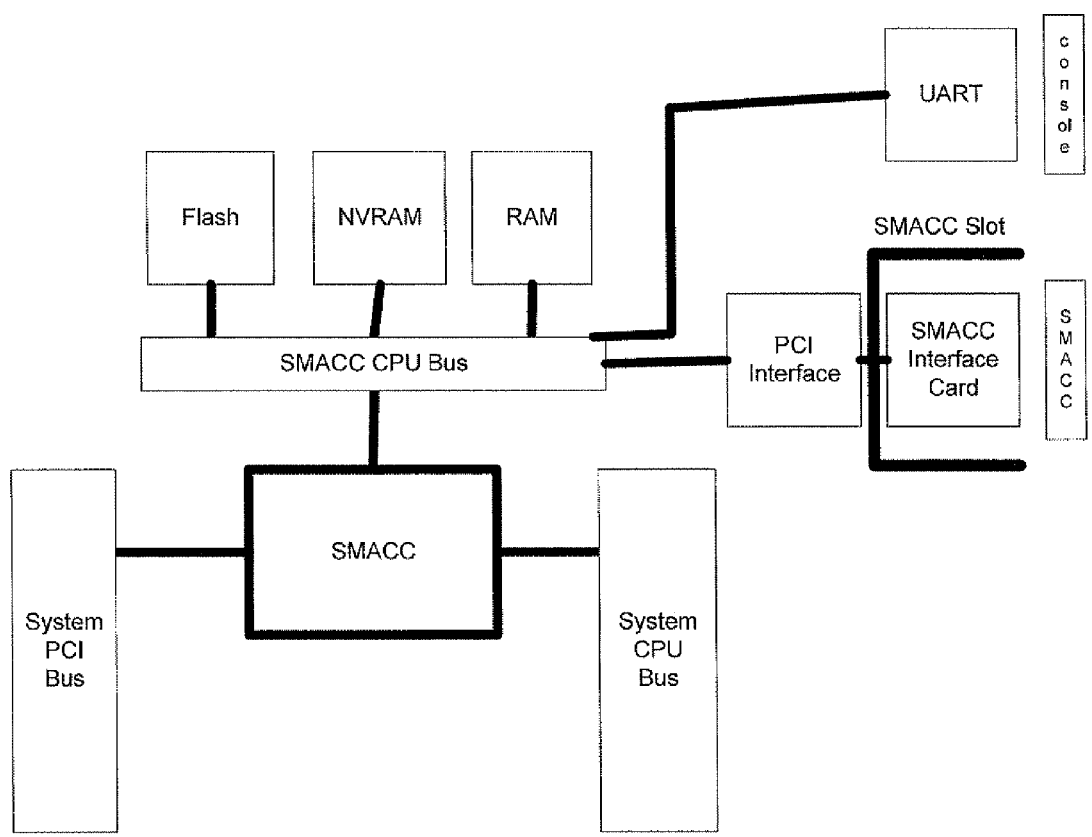
FIG. 12 is a block diagram of an exemplary embodiment of the embedded SMACC chipset including an slot interface for an interchangeable card for a SMACC interface card.

Several embodiments of the SMACC with different types of physical interfaces for a SMACC interface are illustrated. FIG. 9 illustrates an embodiment in which the physical SMACC interface is an integrated analog modem for connection to a PSTN. FIG. 10 illustrates an embodiment of the SMACC in which the physical SMACC interface is an integrated Ethernet interface. This embodiment would be particularly useful it the SMACC interface is going to be connected to a broadband modem and the out-of-band connection is going to be over the Internet. FIG. 11 illustrates an embodiment of the SMACC in which the SMACC interface is an integrated cellular interface for connectivity to a packet cellular network. This embodiment would be both for inclusion in transmission equipment where it would be difficult to break out a circuit for monitoring the equipment, and where the primary circuit is a Digital Subscriber Line (DSL) where disruption of the DSL circuit could also disrupt a POTS line. FIG. 12 illustrates an embodiment of the SMACC in which the SMACC interface includes a card slot such as a Personal Computer Memory Card International Association (PCMCIA) card for inclusion of different types of interface cards. There are exemplary embodiments only are not intended to limit the SMACC to these types of interfaces. Other types of interfaces are also within the scope of this invention.

Figure 13:
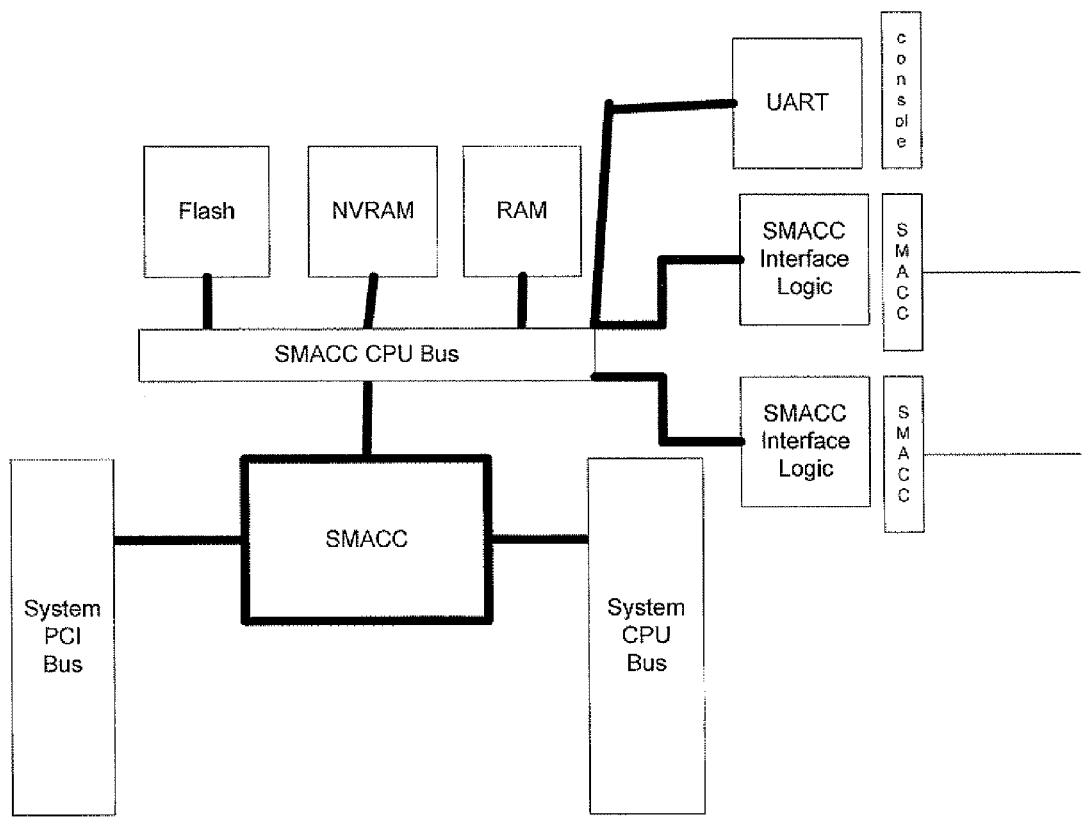
FIG. 13 is a block diagram of an exemplary embodiment of the embedded SMACC chipset including multiple SMACC interfaces.

A SMACC is not limited to only one SMACC interface in implementation. FIG. 13 illustrates an embodiment of the SMACC that includes multiple SMACC interfaces.

SMACC Card

Figure 18:
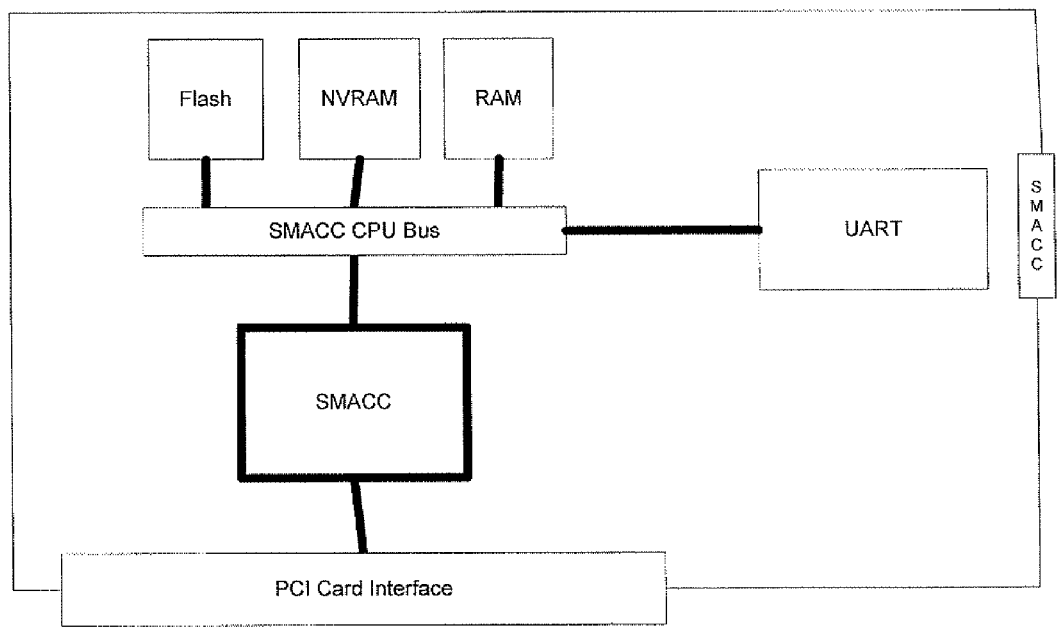
FIG. 18 is a block diagram of an exemplary embodiment of a SMACC card for interfacing to a managed device.
Figure 19:
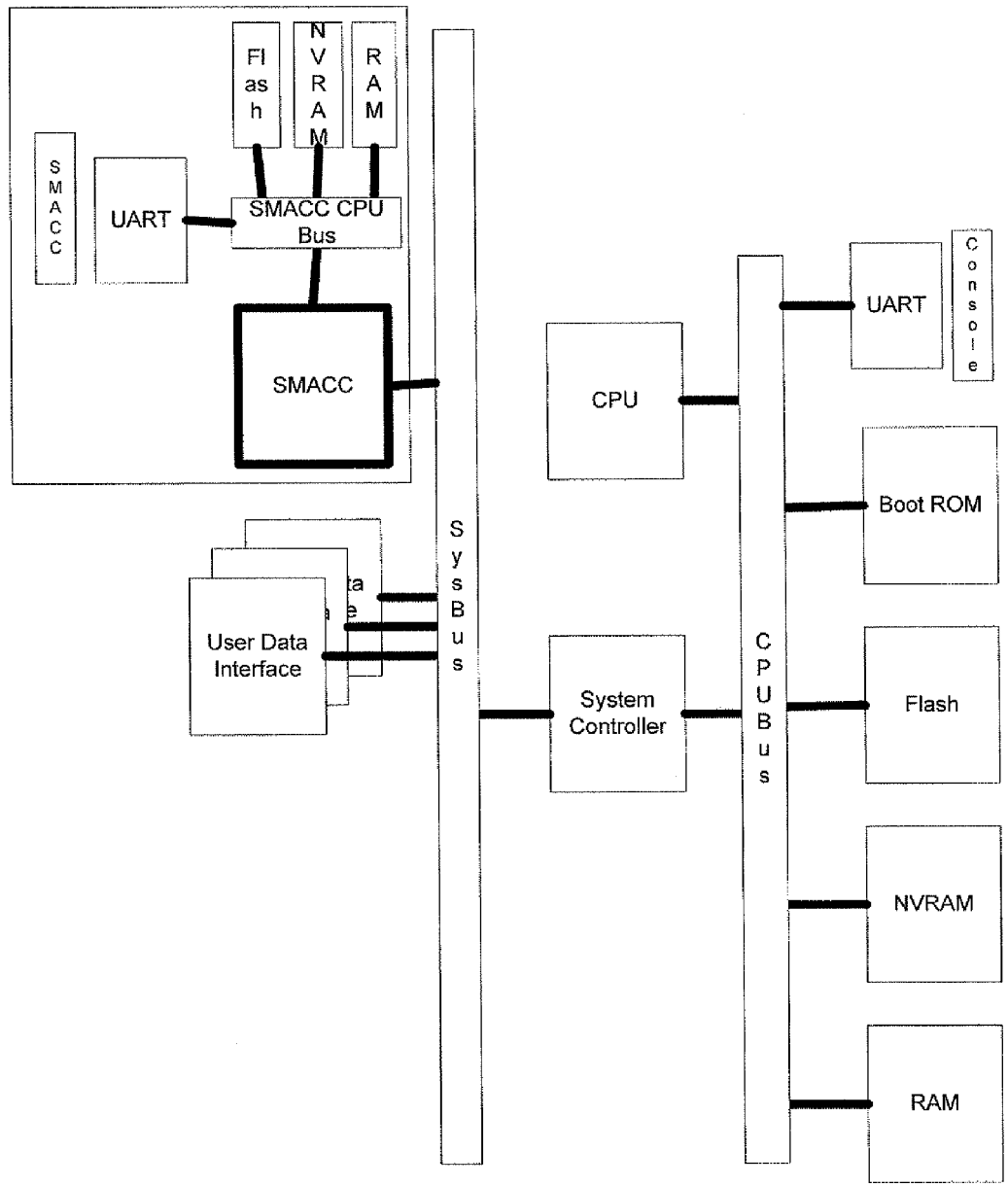
FIG. 19 is a depiction of the system architecture of an exemplary embodiment of a system with a SMACC card.

The SMACC can also be implemented as a card for insertion into a device to be SMACC enabled. An exemplary embodiment of a SMACC card is depicted in FIG. 18. FIG. 19 illustrates the architecture of a system that has a SMACC card inserted into a slot. In this situation, it is likely that the SMACC card would not be on the same bus as the main CPU and the main CPU could well already have its own console port.

Figure 23:
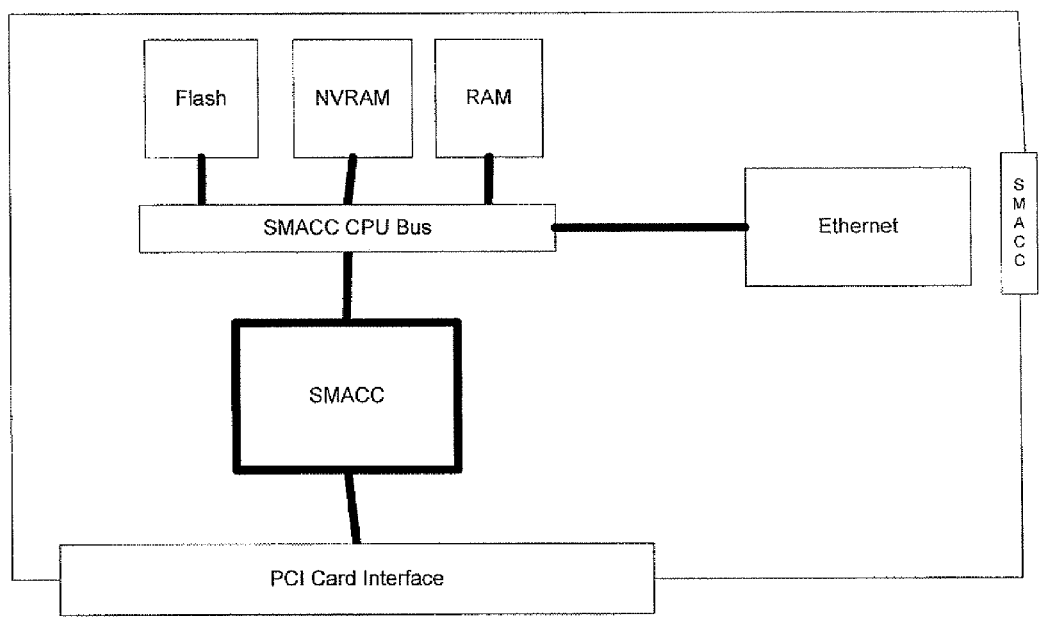
FIG. 23 is a block diagram of an exemplary embodiment of the SMACC card including an Ethernet SMACC interface.
Figure 24:
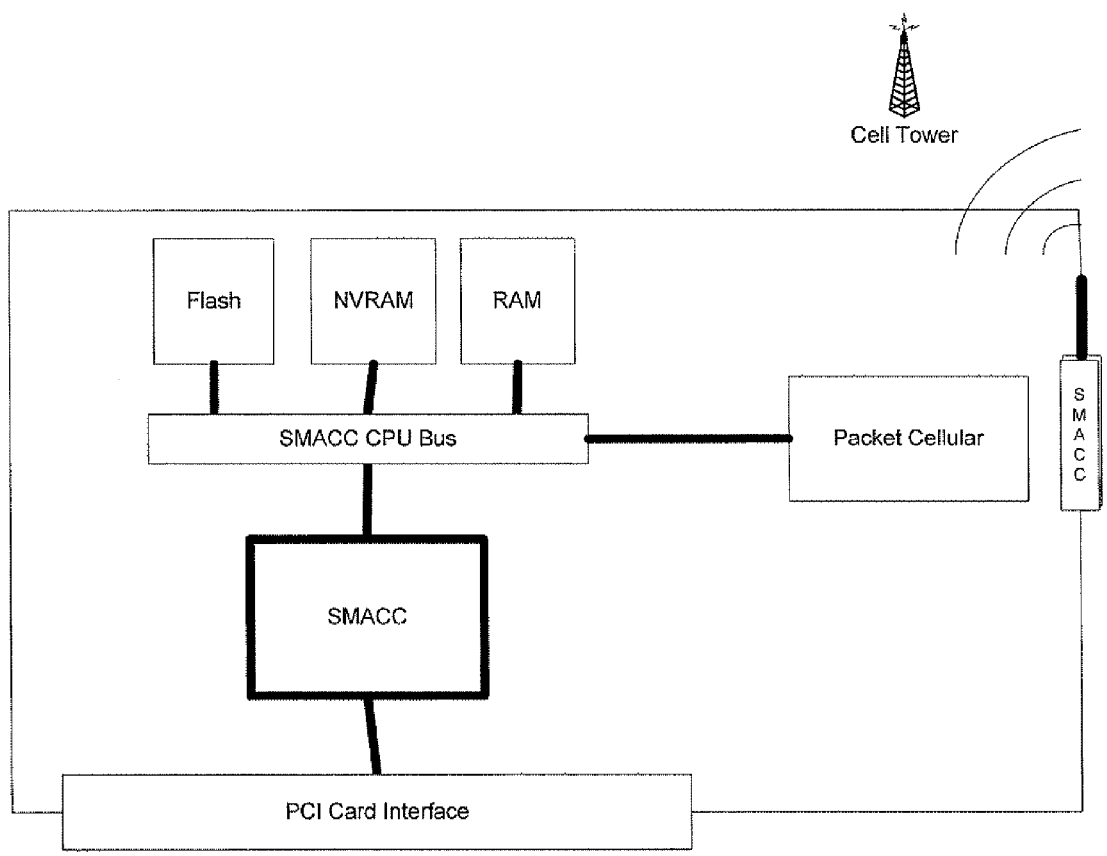
FIG. 24 is a block diagram of an exemplary embodiment of the SMACC card including a Packet Cellular SMACC interface.
Figure 25:
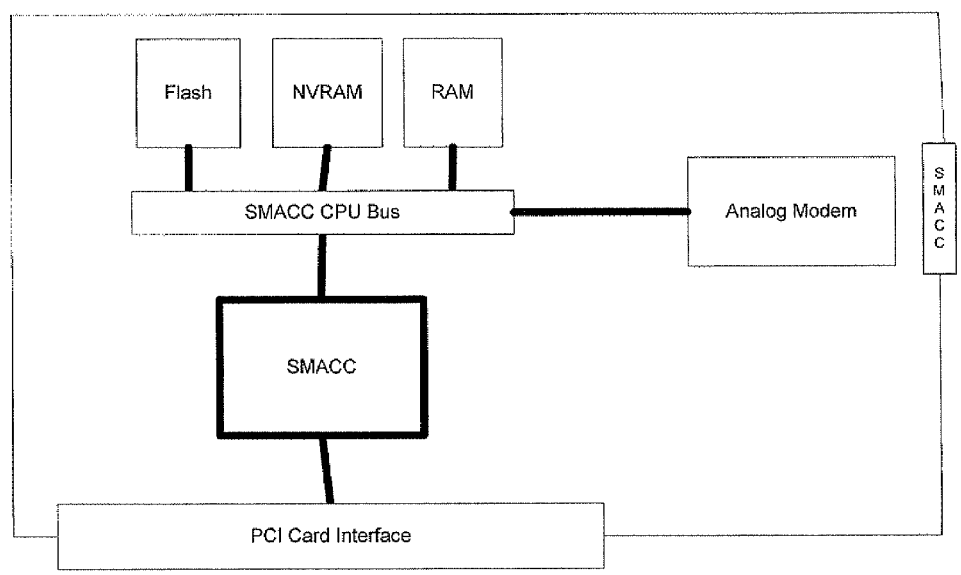
FIG. 25 is a block diagram of an exemplary embodiment of the SMACC card including an analog modem based SMACC interface.

There are also a number of exemplary embodiments of SMACC cards with different exemplary embodiments included. FIG. 25 illustrates an embodiment in which the physical SMACC interface is an integrated analog modem for connection to a PSTN. FIG. 23 illustrates an embodiment of the SMACC card in which the physical SMACC interface is an integrated Ethernet interface. This embodiment would be particularly useful it the SMACC interface is going to be connected to a broadband modem and the out-of-band connection is going to be over the Internet. FIG. 24 illustrates an embodiment of the SMACC card in which the SMACC interface is an integrated cellular interface for connectivity to a packet cellular network. This embodiment would be both for inclusion in transmission equipment where it would be difficult to break out a circuit for monitoring the equipment and where the primary circuit is a DSL line where disruption of the DSL circuit could also disrupt a POTS line. There are exemplary embodiments only are not intended to limit the SMACC to these types of interfaces. Other types of interfaces are also within the scope of this invention.

Figure 26:
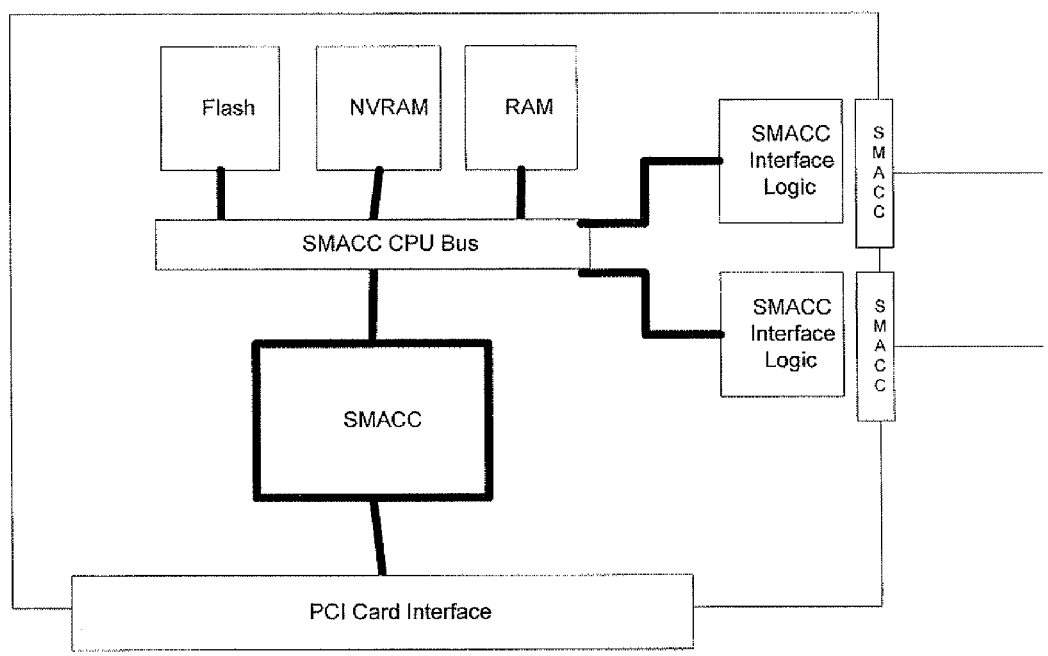
FIG. 26 is a block diagram of an exemplary embodiment of the SMACC card including multiple SMACC interfaces.
Figure 27:
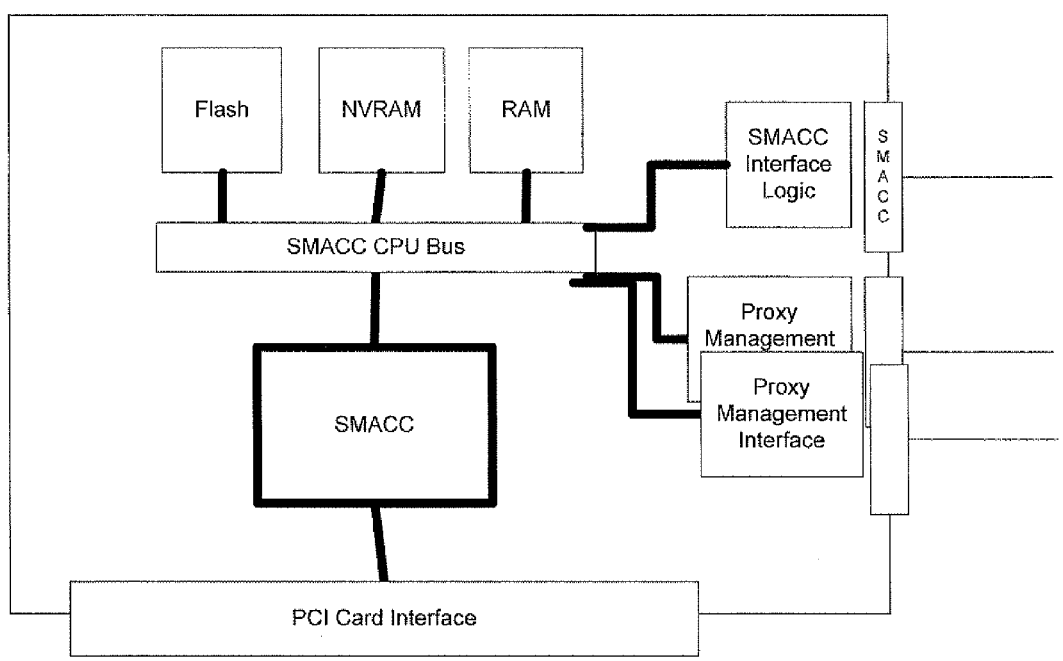
FIG. 27 is a block diagram of an exemplary embodiment of the SMACC card in which dedicated proxy management interfaces are included on the card.

A SMACC card is not limited to only one SMACC interface in implementation. FIG. 26 illustrates an embodiment of the SMACC card that includes multiple SMACC interfaces.

Proxy Management Interfaces

Figure 20:
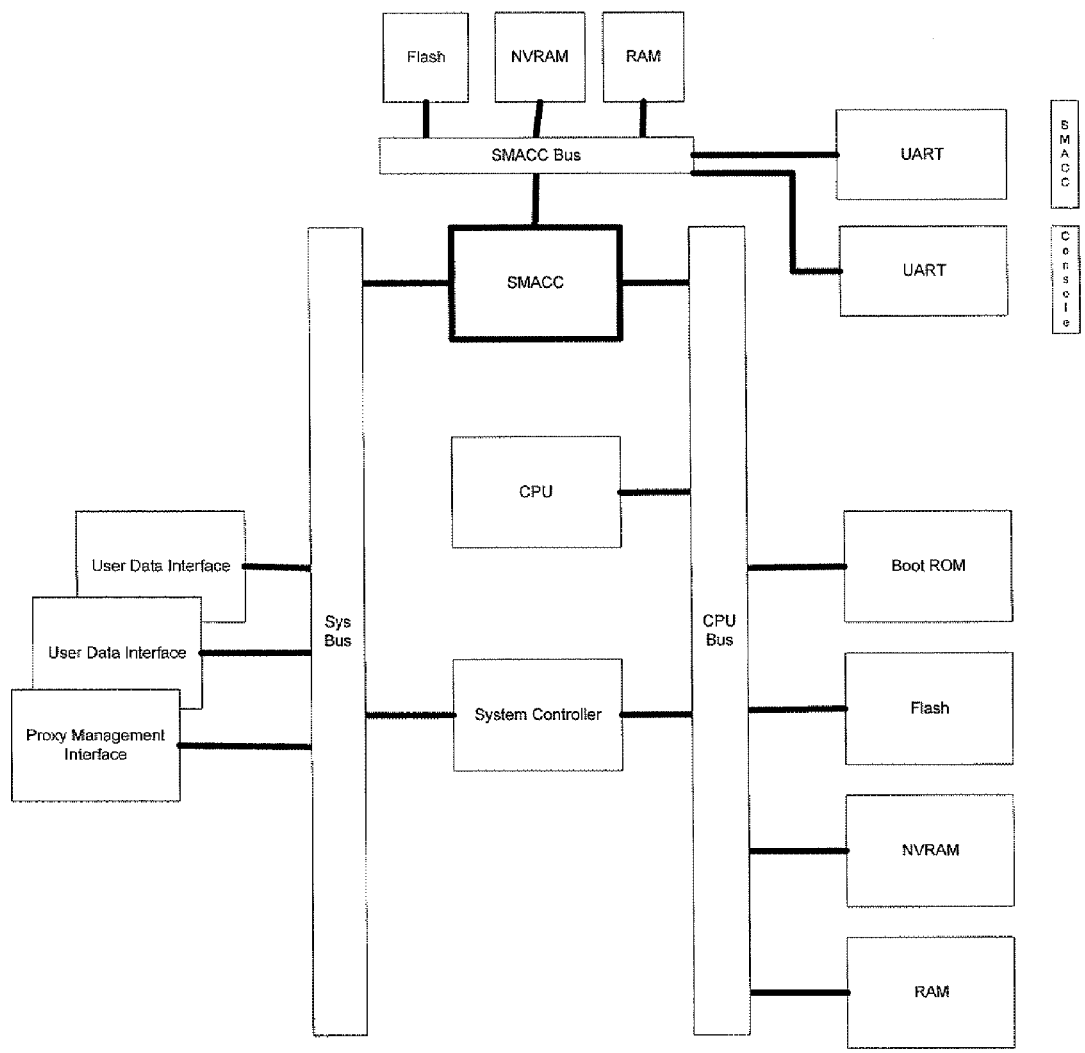
FIG. 20 is a block diagram of an exemplary embodiment of a system with an embedded SMACC showing a user interface configured as a proxy management interface.
Figure 21:
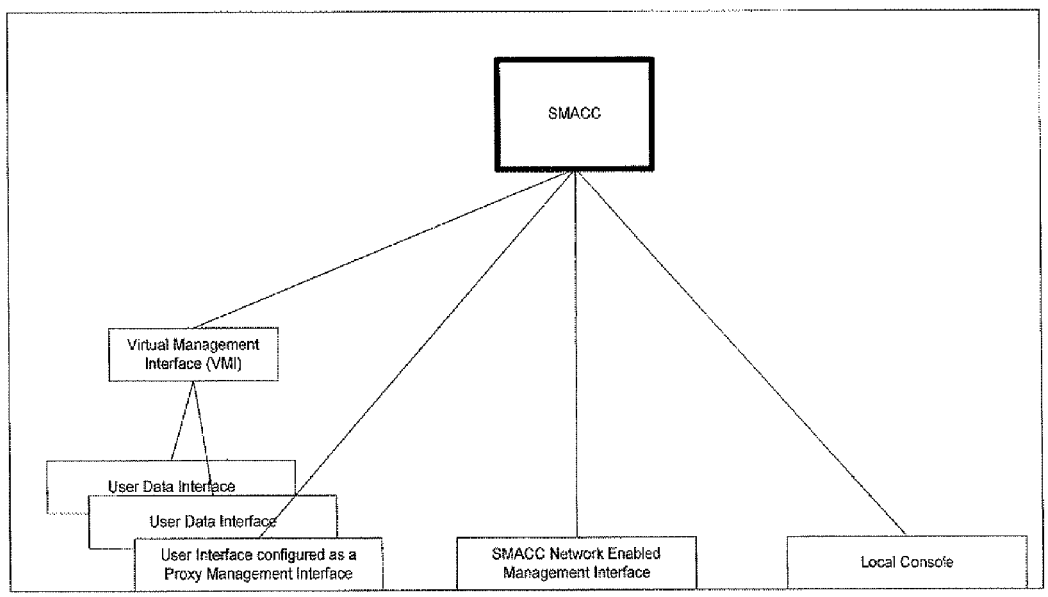
FIG. 21 illustrates a user interface configured as a proxy management interface.

In an additional exemplary embodiment of the SMACC in which the SMACC can be utilized to manage additional devices collocated with the SMACC enabled device, there is a third type of management interface as illustrated in FIGS. 20 and 21. A proxy management interface is not utilized for communicating management data between the SMACC and the remote management center. Rather, a proxy management interface is utilized for communicating management data between a collocated device and the SMACC in which the SMACC is going to act as a proxy for the device providing it with a secure connection to the management center. The SMACC may also provide the proxy managed device with proxy applications for the management of the device.

Figure 22:
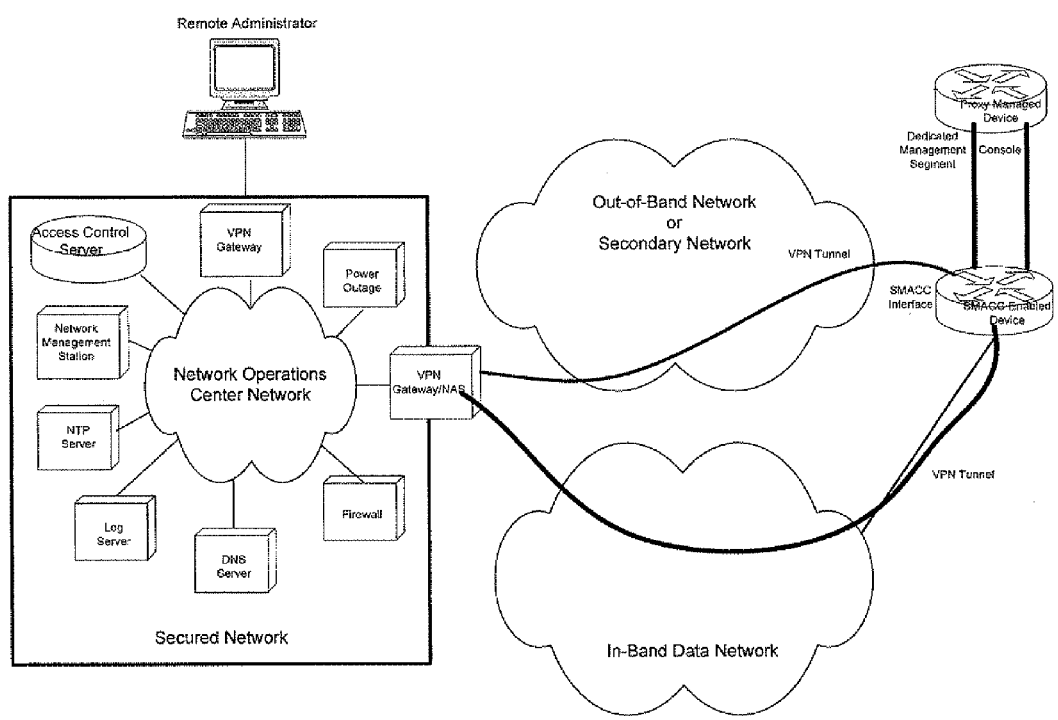
FIG. 22 illustrates a SMACC enabled device acting as a proxy management system for another collocated device providing both a console connection to the collocated device and a management segment connection to the collocated device.

The connections between the SMACC enabled device and the proxy-managed device (as illustrated in FIG. 22) can be either connections to the console port on the proxy managed device, and or a dedicated management segment.

When the connection between the SMACC enabled device and the proxy-managed device, illustrated in FIG. 22, is to a console or management interface on the proxy-managed device, the interface is generally a serial interface and is dedicated for management data. This interface is also typically only used to provide a command line interface for the device.

The dedicated management segment, also illustrated in FIG. 22, typically can support some sort of networking protocol. In this exemplary embodiment of the SMACC, the dedicated management segment supports the Transmission Control Protocol/Internet Protocol (TCP/IP) protocol for networking. This allows a more complete suite of management protocols to be utilized for the management of the proxy managed device. The SMACC enabled device can be utilized to protect Telnet, SSH, TFTP, FTP, HTTP, HTTPS, DNS, NTP, Extensible Markup Language (XML), syslog records, RADIUS transactions, TACACS+ transactions, LDAP transactions, or other protocols for the proxy managed device. Some protocols or services might be configured to be passed through from the proxy-managed device to the management center utilizing an application level gateway on the SMACC for passing this information on. Other applications, such as SNMP, might be implemented as a proxy on the SMACC.

In a preferred exemplary embodiment of the SMACC with proxy management capabilities, the proxy management segments to the proxy managed devices (as illustrated in FIGS. 20-22) should be dedicated for management data between the SMACC and the proxy managed device. This provides the separation of the management data as recommended in the NSA guidelines. The interface type for the dedicated management segment can be any type of interface supported by both the SMACC enabled device and the proxy managed device.

However, in some environments, the dedication of an interface for management data may be greater than a customer can support. For this environment, and alternative embodiment of the SMACC proxy function supports the use of proxy management segments that allows both management data addressed and routed to the SMACC and user data over the same interface. Another alternative embodiment for the SMACC proxy function when the proxy interface is a Local Area Network (LAN) interface is the use of Virtual LANs (VLANs) for separating management traffic from user traffic. VLANs are not as secure as utilizing physically separate interfaces, but for many customers this would be acceptable. One VLAN would point to the SMACC and another VLAN would be utilized for user data. Another alternative embodiment for the SMACC proxy function would be to utilize a VPN tunnel between the SMACC and the proxy managed device. This is an option when the proxy managed device supports the VPN technology on the interface and allows some aggregation of the VPN tunnels at the SMACC enabled device so that every device does not need a VPN tunnel back to the management center.

An additional exemplary embodiment of the SMACC illustrated in FIG. 26 includes additional interfaces as part of the SMACC chipset dedicated as proxy management interfaces. This would be especially useful when a SMACC card is being utilized to SMACC enable a device that does not have an abundance of native user interfaces (for example, a server). This would allow a card to be inserted into a system to manage that system and would allow the card to also manage other collocated systems even if the SMACC enabled system does not have the additional interfaces. These interfaces could be a combination of serial interfaces to be utilized as console proxy management interfaces and interfaces of any type to be utilized as dedicated management segments.

Access to Network Services

Figure 4:
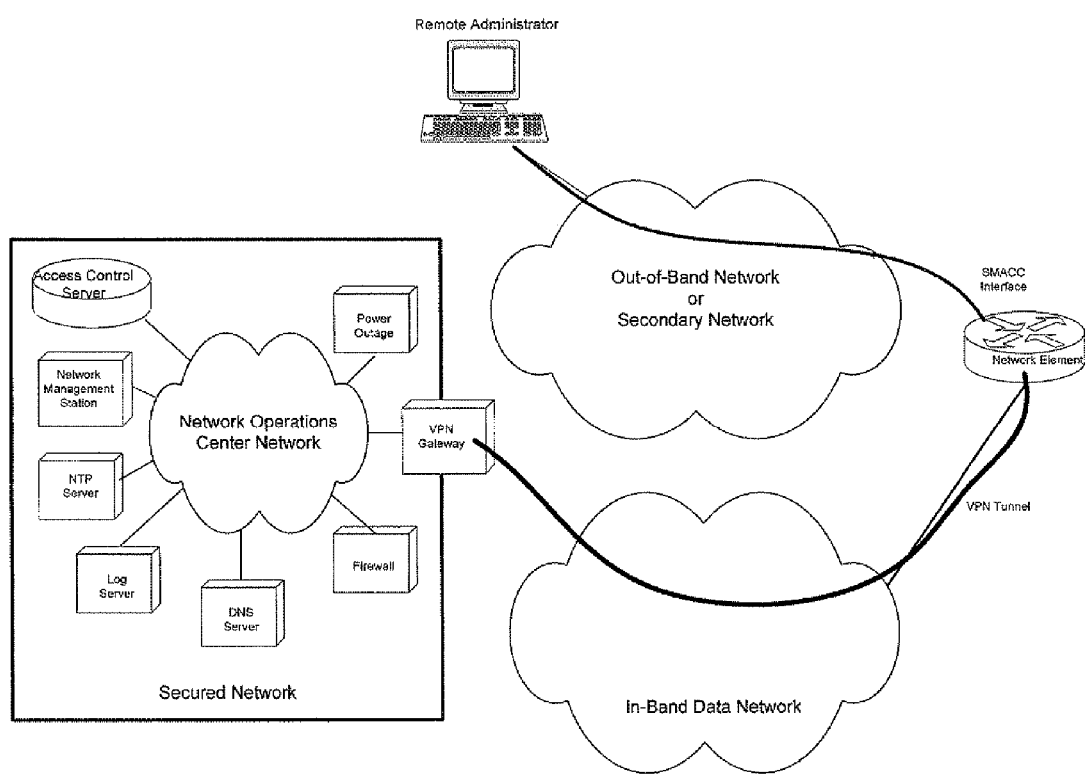
FIG. 4 illustrates network connectivity to the management interfaces.

To effectively manage a large number of devices, it is important for the devices to have access to a set of services provided through a network. These services are often centrally located at a network operations center (NOC) or management center, as depicted in FIG. 4, or at an Application Service provider (ASP). A SMACC enabled device will be able to be configured to securely access these network services over the user interfaces utilizing the VMI or over the SMACC interfaces. There are significant advantages in a network design that allows the management service to be accessed over either type of interface. Typically the network services like an ACS server, a DNS server, a logging server, a network management station, or an NTP server will need to be accessed.

There are a number of ways the management interfaces of a SMACC enabled device can be utilized in a network for remote management of the network elements. Some of the sample configurations include:

Secure Management Access via remote administrator dial over PSTN;

Secure Management Access via Gateway or Network Access Server (NAS) to Out-of-Band Network; and Network Services provided via Out-of-Band Network.

Secure Management Access Via Remote Administrator Dial Direct to SMACC

In this scenario shown in FIG. 4, the remote administrator is using his work station to directly dial the PSTN phone number for the managed device in order to access a SMACC interface on the managed device. In a preferred exemplary embodiment, the SMACC sets up a point-to-point Internet Protocol (IP) connection to the remote administrator and the remote administrator would run a secure client such as secure shell or an HTTPS client on his workstation for communicating with the SMACC interface. This would secure the communications between the remote administrator and the SMACC.

The SMACC can and should be configured to perform authentication and authorization of the remote administrator before allowing access to the management functions for the managed device. While the SMACC could be configured with a database of authorized administrators, it is also possible to utilize an ACS to authenticate and authorize a remote administrator. The SMACC utilizes its VMI to access network services such as an ACS in the network using a protocol such as RADIUS, TACACS+, or LDAP. This would allow centralized authentication and authorization of the administrators. In this type of configuration, if connectivity to the network services is down, the SMACC would not be able to utilize a central ACS and would have to revert to allowing access based on a locally maintained database.

Secure Management Access Via Gateway to Out-of-Band Network

Figure 5:
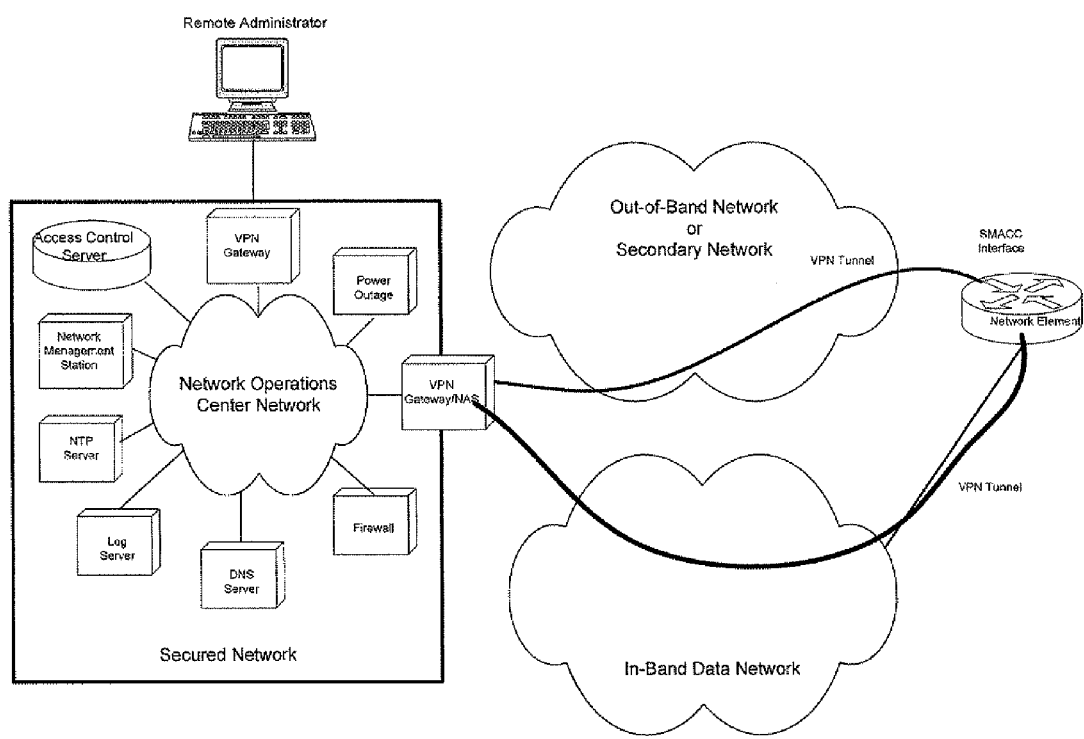
FIG. 5 illustrates an additional design for connectivity to the management interfaces.

FIG. 5 shows another configuration that can be used to allow remote administrators access to a SMACC enabled managed device. A gateway or Network Access Server (NAS) is utilized to dial out to the SMACC interface on the managed device from a secure network that provides the needed network services. When the administrator initiates a connection to the address of the SMACC interface, the gateway will initialize a connection to the SMACC interface (using a VPN tunnel) if a connection is not already up. The SMACC interface can then also utilize the VPN tunnel back to the management center to access the needed network services (including an authentication/authorization server) if the services are not available over the VMI.

The out-of-band network does not have to be a PSTN network. For instance, in FIG. 5, if the SMACC's connection to the out-of-Band network is a DSL connection to an Internet Service Provider (ISP) and the Network Operations Center Network has a gateway to the internet this diagram would work as well.

Network Services Provided Via Out-of-Band Network

One difficulty with using a centralized ACS is that, on occasion, a network administrator is attempting to access a network element during problem determination when the network connectivity is down. Requiring an administrator to know a locally configured password on the managed device to access the management interface to a network element every time network access was down would risk the security of the system. Too many people would have access to the password.

A major advantage of the network design in FIG. 5 is the utilization of the out-of-band network connection for connectivity to the ACS for authentication and authorization as well as other network services. If the SMACC interface is utilizing a broadband connection such as DSL to access an ISP and then is utilizing a VPN client to connect to a VPN gateway on the in-band data network, not only can this VPN tunnel be used for remote administrator access to the SMACC interface, but the VPN tunnel can also be used by the SMACC interface to access network services at the network operations center. The managed device can be configured to always utilize the out-of-band connection for network services, or only to utilize it when they are not available over the VMI because the user network connections are down. The connection between the User Data Network and the Internet would be able to utilize VPN services that exist today for VPN gateways.

In the configurations where a VPN tunnel is being built across the out-of-band network as shown in FIG. 5, the network administrator may decide to allow the remote administers to use the telnet protocol to access the managed device if they trust the security of the Network Operations Center Network. The telnet traffic would travel in the clear between the remote administer and the gateway. In the exemplary embodiment, the gateway would encapsulate the traffic in an Internet Protocol Security (IPSec) tunnel providing for data confidentiality and integrity as it travels across the "untrusted" out-of-band network. The SMACC would then receive the traffic from the IPSec tunnel and would proxy the management of the rest of the device.

Figure 6:
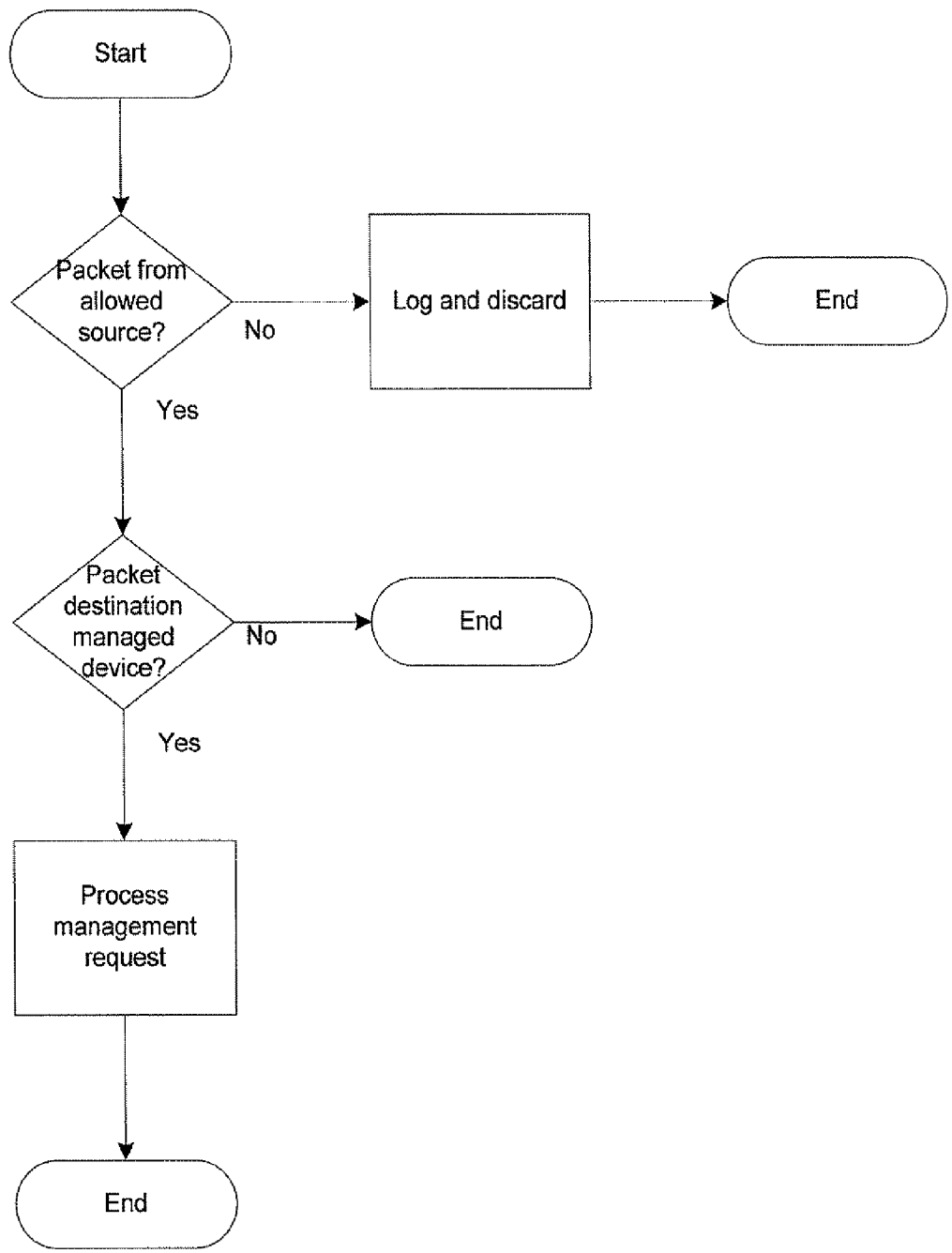
FIG. 6 illustrates the packet filtering for access to the SMACC.

The SMACC can be configured to filter packets on various criteria such as origin IP address or telephone number. For example, as shown in FIG. 6, if a packet is not from a valid source, log information will be recorded and the packet will be discarded. If the destination of the packet is for the managed device, the packet will continue to be processed. If the destination is not for the managed device, the packet may optionally be logged and will be discarded. The management interfaces of the SMACC can also be configured to only allow the specific interfaces necessary for management of the device. If the packet is not for a necessary protocol, it will optionally be logged and discarded.

Figure 7:
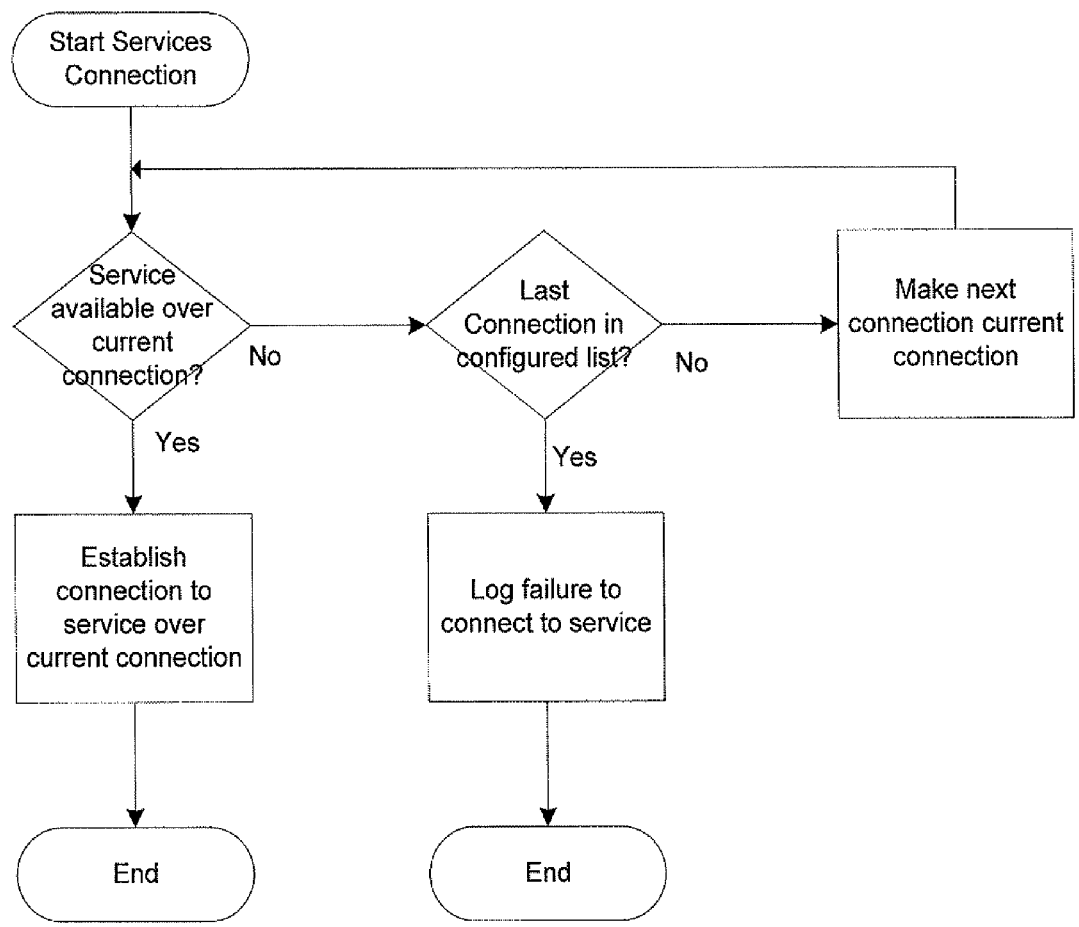
FIG. 7 illustrates the selection of a secure path for management services.

The SMACC can make extensive use of network services in order to facilitate the remote management of SMACC enabled devices. These services can include a centralized authentication server, a network time server (utilizing a protocol such as network time protocol (NTP)), remote logging servers, and network management stations for reporting. The SMACC is set up to be able to access these network servers over the VMI interface or over the SMACC interface. There are circumstances where it would be useful to utilize the VMI interface when connectivity is available and only use the SMACC interface when the in-band connections for the VMI are not available. The SMACC can be configured to attempt to connect to network services according to a priority list starting at the top of the list, see FIG. 7.

Figure 8:
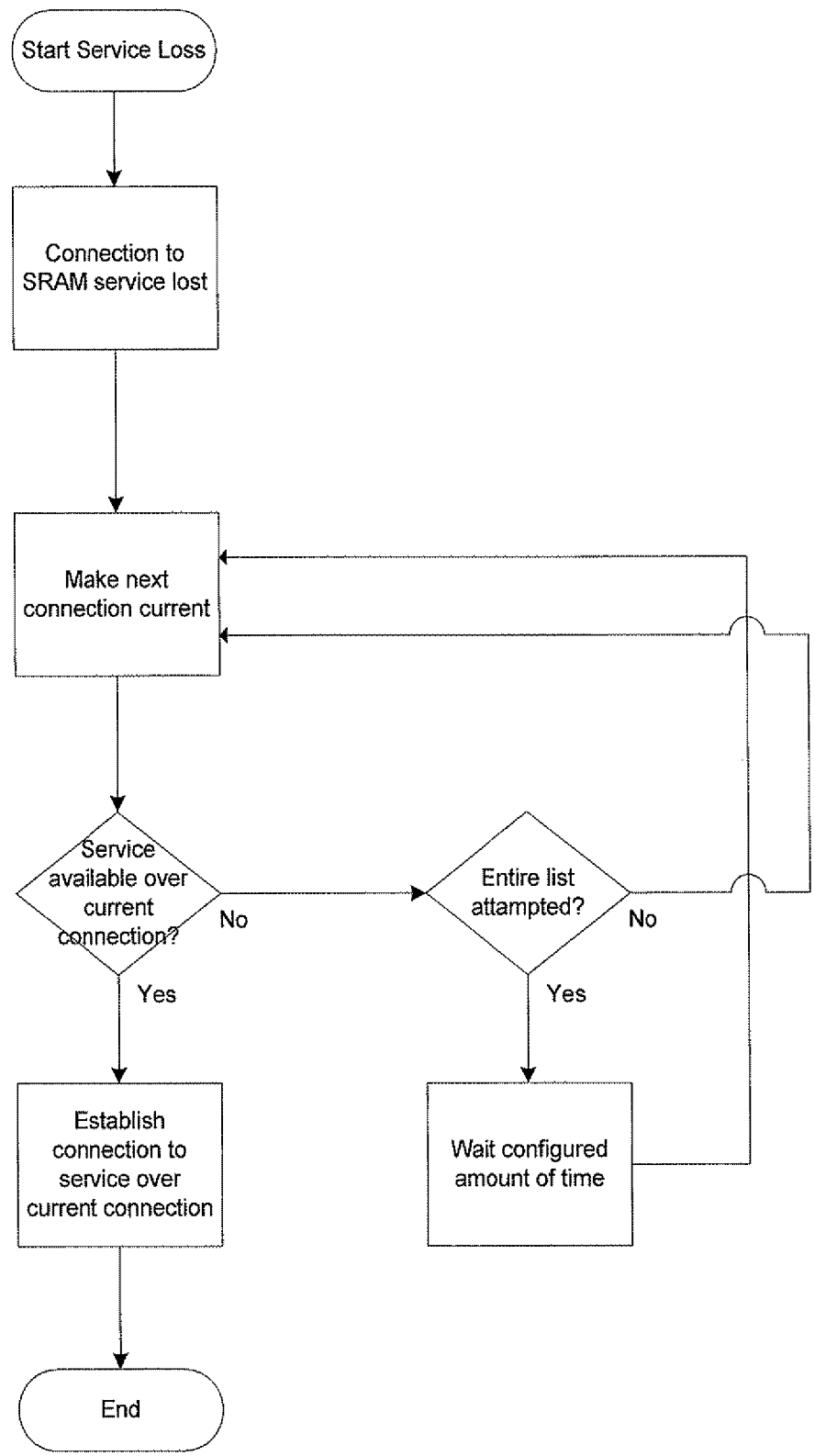
FIG. 8 illustrates changing which management path is used for management services.

In the event that an existing connection of a network service is lost, the SMACC can attempt to reestablish a connection to the network service over another interface, as shown in FIG. 8. The SMACC can be configured to give preference to the VMI or to the SMACC interface.

An exemplary embodiment of the SMACC interface may include an integrated modem, as illustrated in FIG. 9, consisting of an interface to a telephone line and a Data Circuit-terminating Equipment (DCE) interface for a connection to Data Terminal Equipment (DTE). Additional exemplary embodiments of the SMACC interface may include one or more of the network interfaces illustrated by FIGS. 10 and 11 which include but is not limited to an Ethernet interface or a cellular interface. In particular, this application would be well suited for cellular packet data.

An additional exemplary embodiment is depicted in FIG. 12 in which the SMACC interface on a device can be a card where the user can select the type of interface they want for the SMACC interface by plugging the appropriate card into the SMACC slot.

An additional alternate exemplary embodiment is illustrated in FIG. 13 in which there can be multiple SMACC interfaces for dedicated management access. This provides for additional redundancy and reliability of the SMACC interface functionality over multiple networks.

FIG. 14 depicts an additional exemplary embodiment in which the SMACC processor does not have its own dedicated Flash, RAM, or NVRAM, but rather shares these resources with the main processor. In this embodiment, segments of these resources would be dedicated for use by the SMACC processor.

Command, Control, and Monitoring functions for the device being managed are passed through the SMACC processor. This will include configuration commands, operational commands, monitoring commands and updates, etc. Only user data will not have to pass through the SMACC processor. SNMP traps and remote syslog messages will also be passed through the SMACC and sent on either the VMI or a SMACC interface.

When an administrator is logged into the SMACC processor for controlling the managed device, there will also be commands for configuring and controlling the SMACC processor itself. This will include configuration of parameters for the SMACC interface, the Virtual Management Interface, configuration of connectivity parameters for the gateway device at one or more management centers, configuration of network services located at the management center, configuration of access controls restricting what administrators are authorized to access the management functions of the device, as well as other possible functions and commands. Among the possible services to be configured on the SMACC for utilizing are network management stations utilizing SNMP or XML, TFTP servers, FTP servers, remote syslog servers, NTP servers, and DNS servers.

The availability of multiple and diverse paths for reporting status information to monitoring stations or allowing for remote configuration of the device are significant advantages of designs where only one or non-diverse paths are utilized. The use of the SMACC interface to connect to and protect traffic over a diverse network allows the device to regularly report on the status of the device and its connections even in the face of a loss of the network connection. This status information can be reported via standardized means such as Simple Network Management Protocol (SNMP), or via private protocols, or a combination of both either over the VMI when it is available and/or over the SMACC interface. This is especially important if status information is to be communicated when the user interfaces are down.

It is also possible to configure the SMACC processor to receive console messages and log messages, filter the messages, and send an alert over either the VMI and/or the SMACC interface for certain error conditions such as a particular interface going down. If the interface that went down were the interface the router would normally utilize for connectivity to the management center, the SMACC interface might be the only way the alert gets sent.

The use of the VMI for connecting to the SMACC processor for management of the device allows the management data to logically isolated from user data, but still physically use the user data network. This has the possibility of reducing charges for the secondary network utilized by the SMACC interface, especially if charges for the secondary network are based upon connect time or packet/byte counts. The normal operational method of reaching the SMACC processor would be through the in-band network to the VMI, and only then a path to the VMI is not available would the secondary network need to be utilized. Since the secondary network often has lower performance characteristic, it is likely that the in-band path through the VMI will also provide for a faster connection when the in-band data network connections) are available.

The exemplary embodiment of the SMACC interface includes a POTS connection to the PSTN depicted in FIG. 9. An additional exemplary embodiment includes a means of automatically monitoring the status of the connection to the telephone network. This monitoring can be accomplished by measuring the voltage levels of the telephone line with a circuit similar to FIG. 15 and/or by periodically taking the line off-hook and checking for dial tone as shown in the flow chart in FIG. 16. If the SMACC detects the connection to the telephone network is malfunctioning it will notify a monitoring station using the management connection over the VMI or if additional SMACC interfaces are operational, over another SMACC interface.

In the exemplary embodiment depicted in FIG. 2 where a UPS is incorporated to supply a limited amount of power to the SMACC processor and chipset on the loss of power to the managed device, an additional exemplary embodiment allows the SMACC processor to monitor the supply of external power to the power supply. The exemplary embodiment depicted in FIG. 17 utilizes an external UPS to provide a limited supply of power in the event of a power outage and provide a management connection from the external UPS to the SMACC for management of the UPS. This would include notification by the UPS to the SMACC on the loss of external power. If the SMACC detects a power loss from the external power source, it will notify the management center of the loss of power. It is likely that the VMI will not be able to be utilized for this notification if power has been lost, but for certain secondary networks such as the PSTN network or a cellular network, it is likely that the SMACC interface to that secondary network would be able to be used to report the outage.

In yet another exemplary embodiment of the SMACC processor as depicted in FIG. 2, the SMACC processor can provide a means of "cycling" the power for the managed device. When logged into the SMACC processor, the administrator could issue the "power cycle" command to cycle the power for the circuit for the main processor (circuit 2 in FIG. 2). Allowing an administrator to power cycle device while connected to SMACC processor over a SMACC interface allows the remote administrator to see all the boot commands for the managed device.

Figure 32:
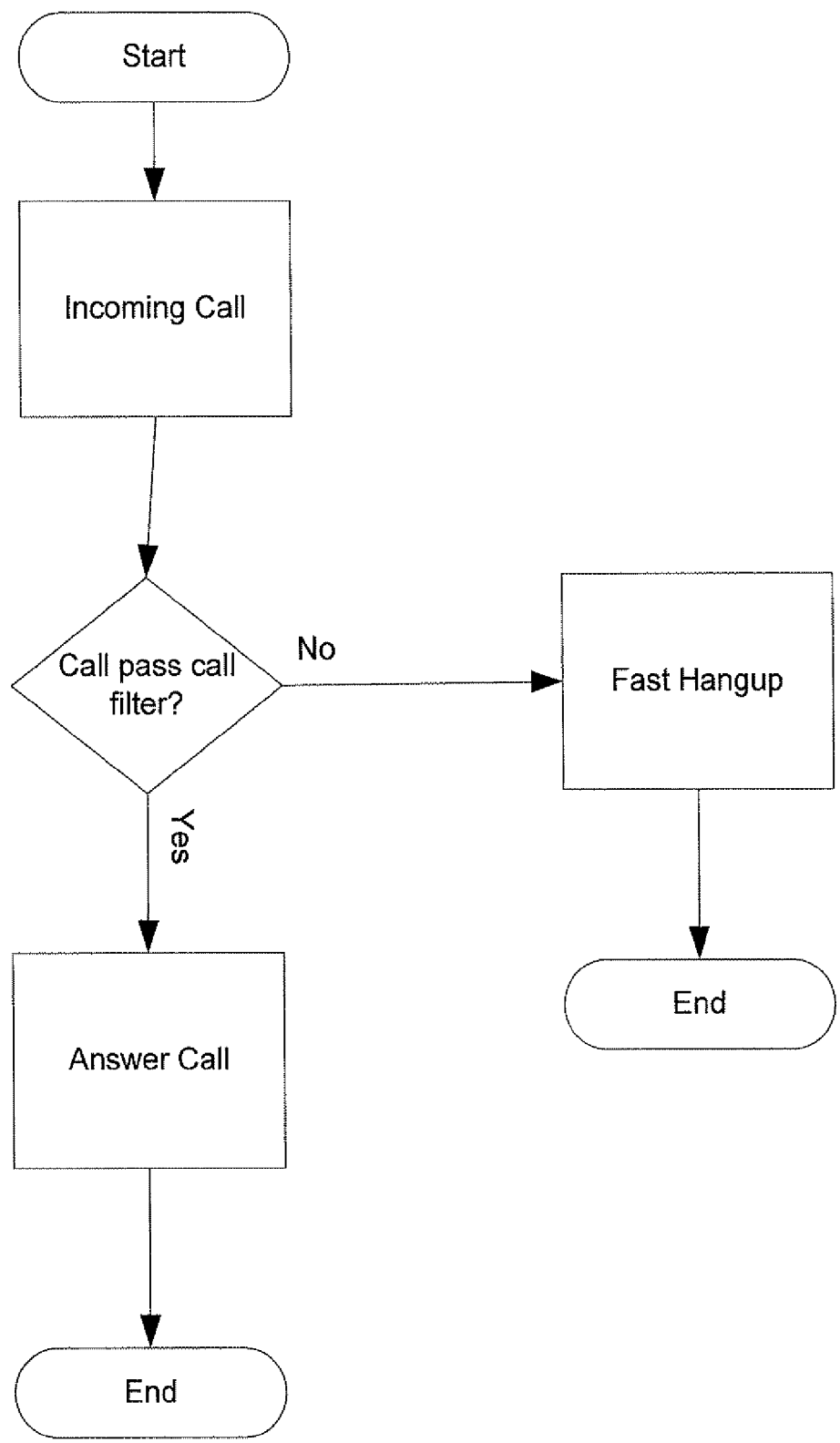
FIG. 32 illustrates Fast Hangup.
Figure 8:
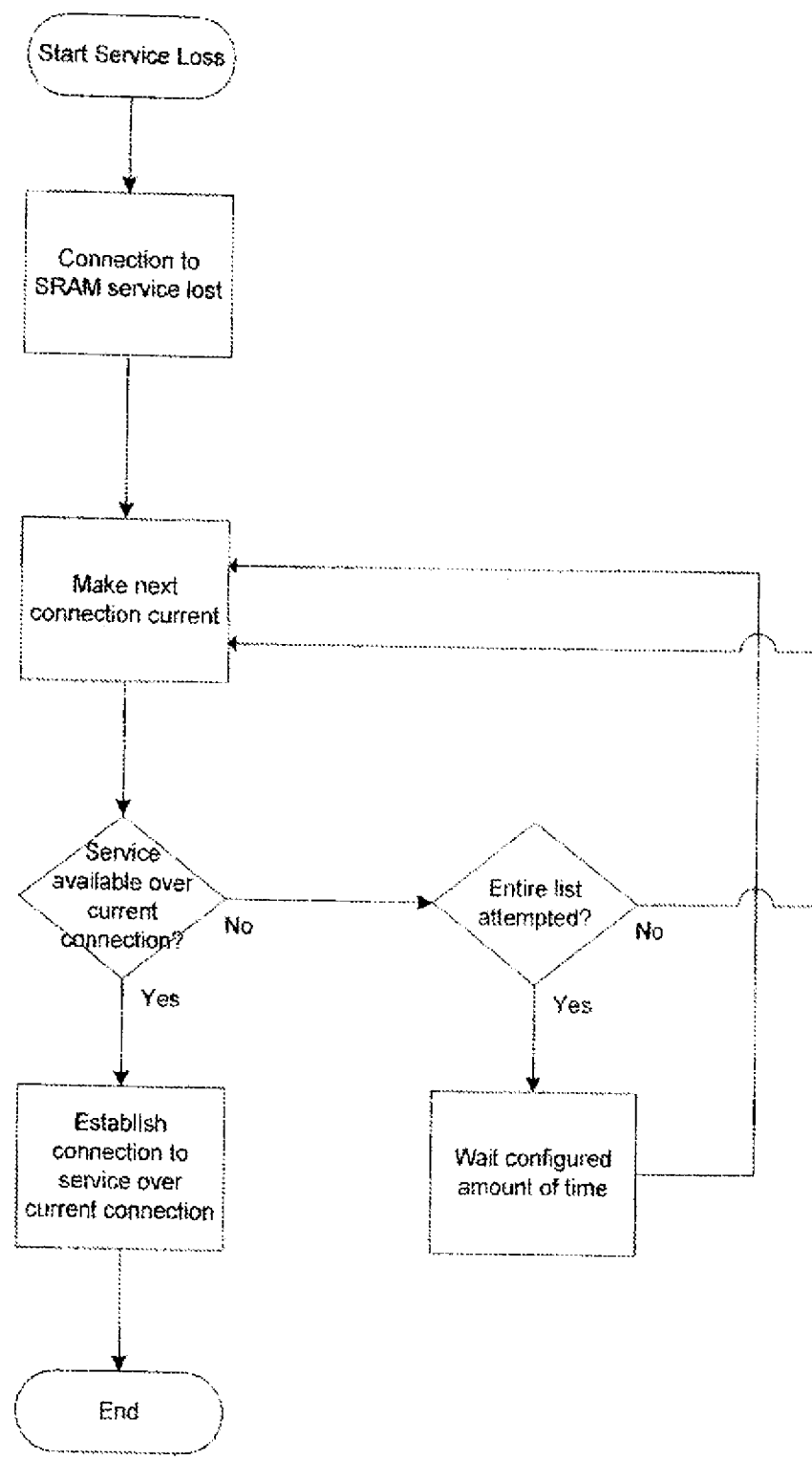

In order to defend against denial-of-service attacks on the PSTN line the SMACC Interface receives Caller ID on the calls it receives. Filtering of calls based on Caller ID can be performed by the SMACC processor. In an exemplary embodiment, calls from an unauthorized source will be answered and immediately disconnected as illustrated in FIG. 32. Notification of the attack can be made to the management center (over the VMI or a SMACC interface). If the VMI does not have an operational path to the management center and a SMACC interface is not available, the SMACC processor can be configured to bring up a SMACC interface to report the attack to the management center.

The VMI allows the SMACC processor to utilize data network ports to securely tunnel management traffic to the management center. The SMACC will run a suitable Virtual Private Network (VPN) protocol such as IPSec over the VMI.

This allows the SMACC to take advantage of many services available at the management center such as network management applications, Network Time Protocol Servers, Log Server, Access Control Servers, and provide remote access to the managed device and more specifically the SMACC over the data network. Examples of protocols exemplary embodiments of the SMACC could utilize to allow an administrator access to the SMACC include but are not limited to HTTP, HTTPS, Telnet, or Secure Shell.

The SMACC has the capability to provide management information to a network management station. This could be implemented via standardized protocols such as SNMP or via proprietary protocols. The SMACC can be configured to allow a remote network management station to query the SMACC for information and/or for the SMACC to initiate sending information to the network management station. The SMACC can be configured to send selected information on a periodic basis as well as send selected information when specified threshold conditions are met or error conditions occur. This is referred to as setting traps for information to be sent. Some management protocols also allow operating parameters of the SMACC to be changed by the remote administrator using the protocol. This information will be sent over either the VMI or over a SMACC Interface and will be encrypted using a VPN protocol.

SMACC access to the management center servers allows the SMACC to access an NTP Server and a log server. The NTP server allows the SMACC to maintain an accurate time source and to use the time source for time stamping log information. The SMACC could also log events both locally and remotely at a log server over the network. Keeping proper log and audit information is a vital part of network management.

An additional service the SMACC can utilize through the VMI or the SMACC Interfaces is an Access Control Server (ACS). The SMACC will run a client for authentication and can communicate with one or more ACS using standardized protocols such as RADIUS or proprietary protocols. This would allow the SMACC to authenticate and authorize users connecting to the SMACC and determine their privileges on the SMACC. If a protocol such as TACACS+ is being used the SMACC would also be able to provide accounting information to the ACS.

The advantages of using an ACS connected over the network is the user information, passwords and privileges can be configured on one central system rather than having to be configured in every device in the network. For larger networks with a large number of administrators centralized authentication is mandatory. The SMACC would be able to perform authentication and authorization using the connection to an ACS over the VMI or SMACC Interface. Allowing the SMACC to connect to the ACS over either the VMI or a SMACC Interface greatly improves the availability of the ACS to the managed device and the SMACC.

In an exemplary embodiment the SMACC might typically report ongoing network status information and alerts to a network management station using a protocol such as SNMP over the VMI. However, there are times when the SMACC will report network status information and alerts over a secondary network such as the PSTN using a SMACC interface. Typically, this would occur when the SMACC has lost connectivity to the Network Management Station via the VMI. One primary condition the SMACC might want to report in this manner would be the failure of all of the managed device interfaces that could provide a path to the VMI to the management center. A secondary network and a SMACC Interface would then be the only way the SMACC could report the outage. Another event might be the loss of power to the site since the in-band connections could well be down due to the loss of power. To send the alert via a secondary network, the SMACC would initiate a connection using a SMACC Interface to the Management Center. Once this connection is established, the SMACC can send the alerts or status information to the Network Management Station over a secondary network not affected by the power outage (such as a PSTN or cellular network).

As indicated above, one of the events that it might make sense to report over SMACC interface would be the loss of power at the site. The SMACC can be configured to report the loss the main external power source to the power supply. Upon detecting loss of power from the main power supply, the SMACC would be configured to bring up a connection to the management center over a SMACC interface utilizing a secondary network resistant to the affects of a power failure and send the alert to the log server and/or management station. This would provide a Network Management Center quick notification that the underlying cause of a network problem is a power outage at the remote location. This can save significant time during the problem determination process and help get the proper personal involved more quickly.

An exemplary embodiment as depicted in FIG. 2 for providing the SMACC with power for reporting the power outage would include building a power supply with a small UPS and multiple circuits for the power. One circuit would provide power to the SMACC processor and its supporting chips including at least one SMACC Interface. This circuit would be backed up by the UPS. The second circuit would provide power to the rest of the managed device. When power is lost, the UPS would then only have to supply power to the SMACC chips allowing a smaller UPS to be utilized. The SMACC will monitor the power supply for loss of external power and send the alert when that event occurs.

Figure 17:
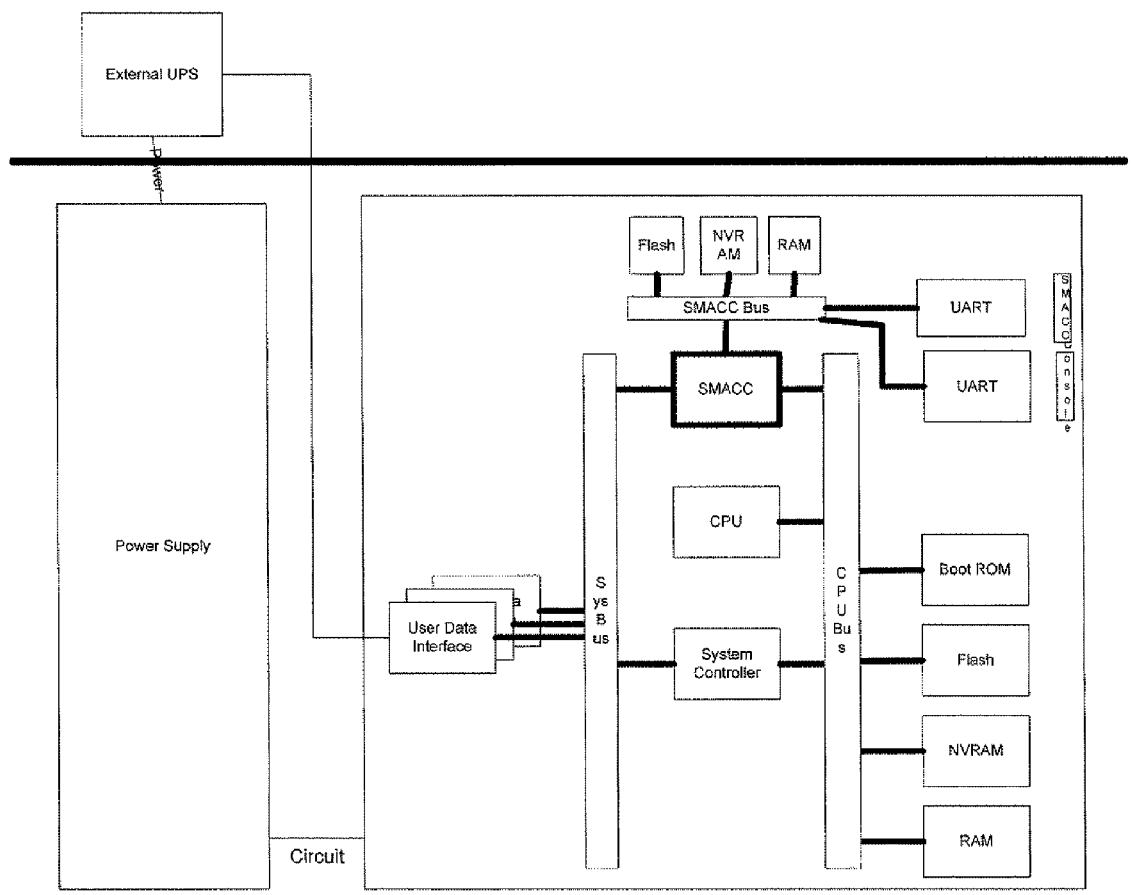
FIG. 17 is a block diagram of an exemplary embodiment of the embedded SMACC chipset with an external UPS.

An additional exemplary embodiment in which there is only one circuit or the UPS backs up both circuits would have the SMACC shutting down the main device when there is a power outage saving power and allowing a smaller UPS to be utilized to enable reporting power outages. Yet another exemplary embodiment would utilize an external UPS as depicted in FIG. 17. The SMACC can be configured to designate a user interface as a UPS monitoring interface. Data from that interface would then be sent to the SMACC and the SMACC would be notified when external power has failed. At that point the SMACC can do a controlled shutdown of the main processor and report the outage over a SMACC interface. Shutting down the main processor right away would reduce power requirements and allow a smaller extern UPS to be utilized. The SMACC could also be configured to forward any other log information or problem determination information. The SMACC could also be configured to keep the SMACC interface active for a specified length of time or as long as sufficient power remained in the UPS The SMACC can also be configured to provide notification to the Management Center when power is restored to the site. When power is restored the SMACC can be configured to wait a determined length of time (perhaps on the order of minutes) to give the network device time to boot and the in-band connection time to reestablish. At the end of that time the SMACC will check the VMI. If the VMI is able to access the Management Center via the in-band connection, the SMACC will send the notification of power restoration to the Management Center via the VMI. If the VMI is not up, then the SMACC will establish a connection over a SMACC Interface to report the power restoration.

An exemplary embodiment of the SMACC that utilizes a POTS connection can monitor the physical connectivity of a telephone line to the SMACC interface that includes an integrated modem and send an alert if the telephone line is disconnected. Access to the SMACC can assist with problem determination and resolution when there is an outage in the network. It might be that the telephone connection to the SMACC interface does not get used very often. It is not unheard of for a telephone line to a modem on a console port to have stopped working for weeks and months before being needed and then discovered to not be functional. When it is needed, such as when there is an outage, it is important to know that the telephone connection will be there and working. Monitoring the connection to the line assists in doing this.

Figure 15:
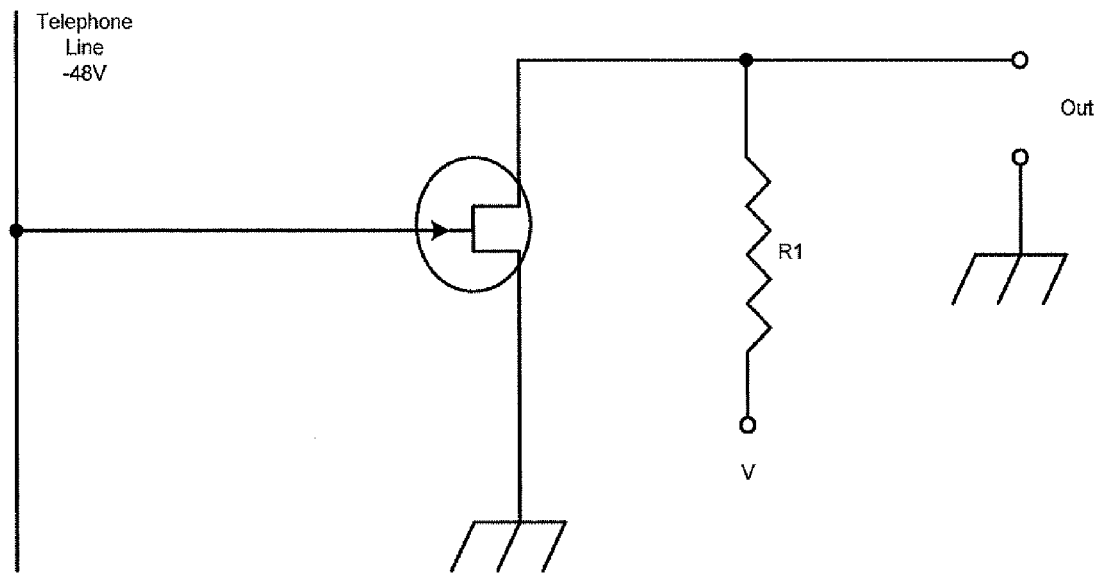
FIG. 15 illustrates a sample circuit for monitoring the voltage on a telephone line.

When a telephone line is in the on-hook state, the line generally carries a voltage. In the USA this is in the vicinity of −48V. To monitor a line that is in the on-hook state it is important to draw very little current if any at all. A FET transistor circuit as depicted in FIG. 15 would be a good candidate for this circuit. A connection from the telephone line would be connected to the gate of the FET transistor. While a high enough negative voltage was maintained on the line, the FET would be in pinch off state and no current would flow between the source and the drain. If the negative voltage was removed from the line and the voltage at the gate went to zero, the FET would allow current to begin flowing between the source and the drain on the transistor. The circuit could detect the flowing current or the circuit could be designed so that the current flow caused a voltage drop at the output to the circuit. This voltage drop could be noted and used to trigger an alert that the line has been disconnected while at the same time drawing very little if any current in the steady state condition. This circuit would provide the most accurate indication of the status of the connectivity of the telephone line when the integrated modem portion of the SMACC interface is in the on hook state.

Figure 16:
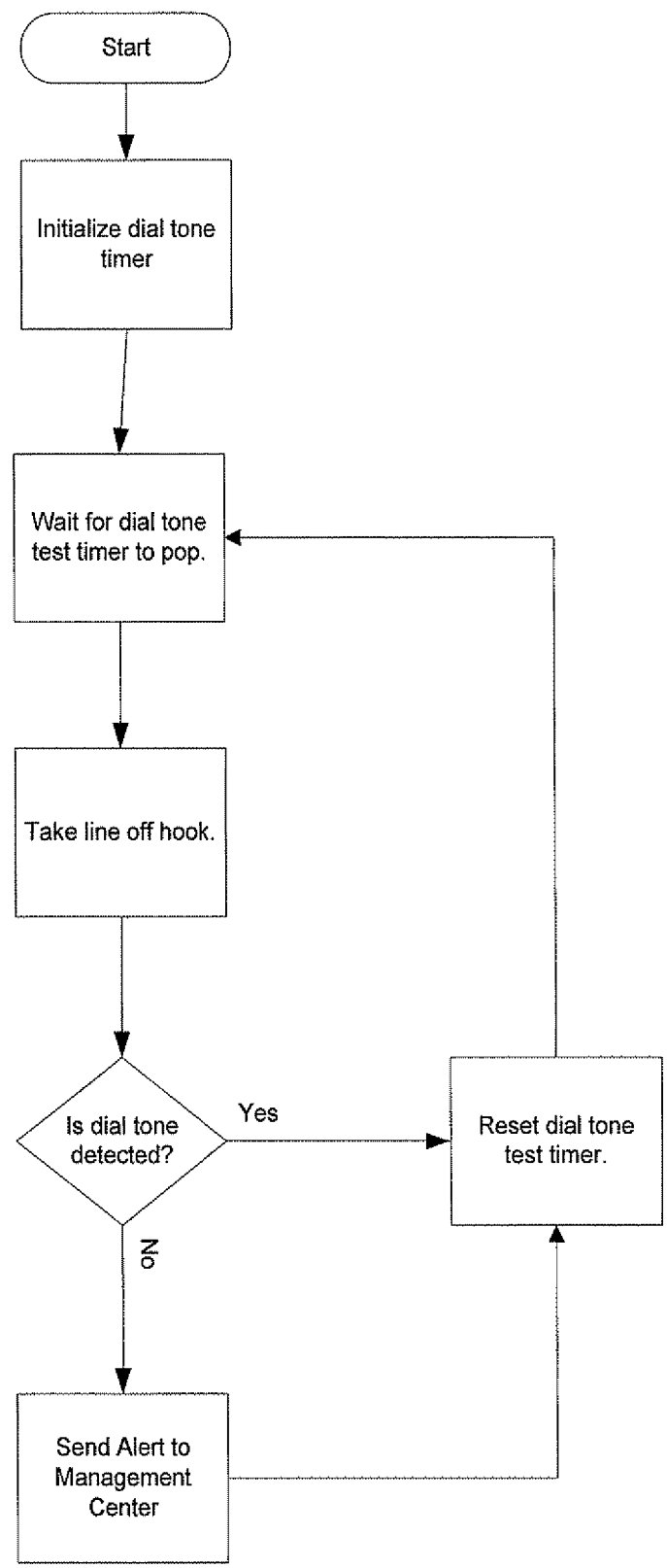
FIG. 16 illustrates a process for monitoring a telephone line for connectivity to a central office.

In situations where it is desirable not to physically monitor the voltage on the telephone line, a method for periodically monitoring the status of the telephone line is possible as depicted in FIG. 16. The SMACC can be configured to periodically request the SMACC interface to go off-hook and dial a telephone number to test for line status. If no telephone number is provided to dial the SMACC interface can go off-hook and monitor for dial tone. If dial tone is returned the SMACC will consider the line still connected. While this will not provide for continuous monitoring of the connectivity, it will still detect the line being disconnected in a timely manner. If the telephone line is currently in use for a connection, the SMACC will consider the line connected and will not need to do the test. The frequency at which this test is performed can be configured.

For a SMACC interface to be as beneficial as possible, it is important for the access connection to the secondary network to be available for legitimate traffic. In the case of a POTS connection, this access could be taken away by an attack on the local loop connecting the SMACC interface to the PSTN local service provider. If an unauthorized user dials in repeatedly, even though they do not get authorized, they are still tying up the local loop connecting the SMACC interface to the central office. In fact, large ISPs have come under attack by Distributed DoS attacks where illegitimate traffic ties up their modem pools so the legitimate users cannot get access to the ISP.

A first step is to monitor caller-id and to note the caller-id of connections that failed to authenticate. In some situations, it is reasonable to limit allowed calls to a set of preconfigured origination numbers. In other situations the originating number can be monitored and if a number of failures to authenticate originate from the same number then the SMACC can be configured for fast failure for some length of time. When a number is not in the list of authorized originating numbers or is flagged for fast failure, the SMACC interface will not attempt to authenticate the user, but will perform a fast hang-up as illustrated in FIG. 32. The SMACC will simply answer the call and immediately hang up on that call. The SMACC can also be configured to reject calls that are marked as P (Private) or O for a set length of time when the SMACC interface is under attack.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus, comprising:
a processor configured to control one or more functions of a network device having a network interface, wherein the network device is configured to receive data requests and an encrypted form of management requests via the network interface, wherein the management requests are from a remote administrator;
a first bus; and
a bus controller coupled to the processor via the first bus, wherein the bus controller is also coupled to a second bus of the network device that is distinct from the first bus, wherein the bus controller is configured to receive the encrypted form of the management requests from the second bus, and to convey the encrypted form of the management requests to the processor via the first bus;
wherein the processor is configured to decrypt the encrypted form of the management requests, wherein the network device includes a processor configured to facilitate operation of the network device, and wherein the processor of the apparatus is distinct from the processor included in the network device.

2. The apparatus of claim 1, wherein the apparatus is configured to provide a command line interface to the remote administrator, and wherein the apparatus is configured to receive one or more commands to control the one or more functions of the network device.

3. The apparatus of claim 1, wherein the bus controller is a peripheral component interconnect (PCI) controller.

4. The apparatus of claim 1, wherein the apparatus is configured to receive power via a first power circuit, wherein the network device is configured to receive power via a second power circuit, and wherein the apparatus is configured to cycle the power received by the network device via the second power circuit.

5. The apparatus of claim 4, wherein the apparatus is configured to:
determine whether the network device is receiving power via the second power circuit; and
provide an indication, to the remote administrator, when the network device is not receiving power via the second power circuit.

6. The apparatus of claim 1, wherein the processor is configured to establish a first virtual private network connection with the remote administrator, and wherein the processor is configured to receive the management requests via the first established connection.

7. The apparatus of claim 6, wherein the processor is configured to establish a second virtual private network connection with an access control server configured to authenticate the remote administrator, and wherein the processor is configured to receive, via the second established connection, an indication of whether the remote administrator is authorized to administer the network device.

8. The apparatus of claim 1, wherein the apparatus is configured to implement a firewall that restricts traffic received from the second bus.

9. The apparatus of claim 1, wherein the apparatus is a component within the network device.

10. The apparatus of claim 1, wherein the apparatus is a card configured to be inserted into the network device via a card interface.

11. The apparatus of claim 1, wherein the network device is a network router that includes a plurality of network interfaces, and wherein the processor is dedicated to controlling one or more functions of the network router.

12. A method, comprising:
receiving, by a bus controller of a management device, an encrypted form of management requests via a first bus of a network device having a network interface, wherein the network device received the encrypted form of the management requests and data requests via the network interface, wherein the management requests are from a remote administrator;
conveying the encrypted form of management requests from the bus controller to a processor of management device via a second bus of the management device, wherein the network device includes a processor configured to facilitate operation of the network device, and wherein the processor of the management device is distinct from the processor included in the network device;
decrypting, by the processor, the encrypted form of the management requests; and
controlling, by the processor, one or more functions of the network device according to the management requests.

13. The method of claim 12, wherein the one or more functions are associated with a domain name service protocol.

14. The method of claim 12, wherein the one or more functions are associated with a network time protocol.

15. The method of claim 12, wherein the one or more functions are associated with a network management protocol.

16. The method of claim 12, further comprising:
establishing, by the management device, a virtual private network connection with an access control server configured to authenticate the remote administrator.

17. The method of claim 12, further comprising:
receiving, by the management device, additional management requests from the remote administrator via a network interface of the management device, and wherein the additional management requests are not received via the first bus of the network device.

18. The method of claim 17, wherein the network interface of the management device is a telephone-line interface.

19. The method of claim 12, further comprising:
receiving, by the management device, power via a first power circuit separate from a second power circuit of the network device; and
cycling, by the management device, power from the second power circuit to reset the network device.

20. The method of claim 12, wherein the management device is a card including the processor and the bus controller, wherein the card is configured to be inserted into the network device via a card interface.

21. The method of claim 12, wherein the network device is a network router that includes a plurality of network interfaces, and wherein the processor is dedicated to controlling one or more functions of the network router.

* * * * *

UNITED STATES PATENT AND TRADEMARK OFFICE
CERTIFICATE OF CORRECTION

Page 1 of 2

PATENT NO.         : 8,474,016 B2
APPLICATION NO.    : 11/946976
DATED              : June 25, 2013
INVENTOR(S)        : Carley It is certified that error appears in the above-identified patent and that said Letters Patent is hereby corrected as shown below:

In the Drawings:

Fig. 8, Sheet 8 of 32, delete "attampted?" and insert -- attempted? --, therefor.

Fig. 8 should be replaced with the corrected Fig. 8 as shown on the attached page.

In the Specification:

Column 3, Line 13, delete "(any one" and insert -- (anyone --, therefor.

Column 6, Line 52, delete "protocol Terminal" and insert -- protocol, Terminal --, therefor.

Column 8, Line 31, delete "tip," and insert -- ftp, --, therefor.

Column 9, Line 40, delete "chips set" and insert -- chip set --, therefor.

Column 14, Line 57, delete "provider" and insert -- Provider --, therefor.

Column 19, Line 55, delete "embodiment" and insert -- embodiment, --, therefor.

Column 20, Line 55, delete "UPS" and insert -- UPS. --, therefor.

Signed and Sealed this
First Day of July, 2014

Michelle K. Lee
*Deputy Director of the United States Patent and Trademark Office*